(12) United States Patent
Burkwald et al.

(10) Patent No.: US 6,356,285 B1
(45) Date of Patent: *Mar. 12, 2002

(54) SYSTEM FOR VISUALLY REPRESENTING MODIFICATION INFORMATION ABOUT AN CHARACTERISTIC-DEPENDENT INFORMATION PROCESSING SYSTEM

(75) Inventors: Susan K. Burkwald; Stephen G. Eick, both of Naperville; Steven H. Patterson, Wheaton; John D. Pyrce; Kurt D. Rivard, both of Naperville, all of IL (US)

(73) Assignee: Lucent Technologies, INC, Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,408

(22) Filed: Dec. 17, 1997

(51) Int. Cl.⁷ ................................................ G06F 3/00

(52) U.S. Cl. .................... 345/853; 345/854; 345/764; 345/835; 345/440; 345/966; 717/3; 717/4

(58) Field of Search ................................. 345/349, 440, 345/966, 357, 356, 348, 967, 837, 835, 853, 854; 717/3, 4

(56) References Cited

U.S. PATENT DOCUMENTS

| | | | | |
|---|---|---|---|---|
| 5,136,690 A | | 8/1992 | Becker et al. ............... | 345/349 |
| 5,191,646 A | * | 3/1993 | Naito et al. .................. | 345/349 |

(List continued on next page.)

FOREIGN PATENT DOCUMENTS

| | | | |
|---|---|---|---|
| CA | 2017969 | 2/1991 | ........... G06F/11/30 |
| CA | 2017974 | 2/1991 | ........... G06F/11/30 |
| CA | 2082848 | 6/1993 | ........... G06F/3/033 |
| CA | 2115237 | 9/1994 | ............ G06F/3/14 |
| CA | 2131508 | 9/1994 | |
| CA | 2127764 | 2/1995 | ........... G06F/15/40 |
| CA | 2129612 | 3/1995 | ............ G06F/3/14 |
| CA | 2131281 | 4/1995 | ............ G06F/3/14 |
| CA | 2158499 | 4/1996 | ............ G06F/9/44 |
| CA | 2171578 | 10/1996 | ........... G06T/17/50 |
| CA | 2200924 | 3/1997 | |
| EP | 0 652 665 A2 | 10/1995 | ............ H04M/3/36 |

OTHER PUBLICATIONS

"Clustering Algorithm for Computer Network Management Graphics," IBM Technical Disclosure Bulletin, vol. 31, No. 1, Jun. 1988, Armonk, U.S. pp. 71–79.

(List continued on next page.)

*Primary Examiner*—Raymond J. Bayerl
*Assistant Examiner*—Cuong T. Thai
(74) *Attorney, Agent, or Firm*—Oliff & Berridge, PLC

(57) ABSTRACT

A software visualization technique allows a software application or portfolio to be visually analyzed to determine the extent and depth of problems raised when converting an existing software application or portfolio to make application- or portfolio-wide revisions, such as those needed to respond to the year 2000 problem or the conversion to Euro currency. The software visualization technique first generates or inputs statistical data on a number of different software metrics and statistics about the conversion process, such as the data or currency dependent lines of program code, the types of affected code lines, and the sizes and complexities of the systems, subsystems and programs of a software application and of the applications forming a portfolio. These metrics and statistics are then used to alter the appearance of various views of the software application, systems, subsystems, programs individual lines of the programs generated by various visualization tools of the software visualization technique. By interacting with the various views, an analyst can quickly and cost-efficiently determine which portions of the application or portfolio need revision, and the optimal methods for implementing the revisions.

77 Claims, 20 Drawing Sheets

U.S. PATENT DOCUMENTS

| | | | |
|---|---|---|---|
| 5,557,730 A | * 9/1996 | Frid-Nielsen | 345/349 |
| 5,564,048 A | 10/1996 | Eick et al. | 395/156 |
| 5,572,650 A | 11/1996 | Antis et al. | 345/356 |
| 5,581,797 A | * 12/1996 | Baker et al. | 345/326 |
| 5,596,703 A | * 1/1997 | Eick et al. | 345/326 |
| 5,623,590 A | 4/1997 | Becker et al. | 345/326 |
| 5,636,350 A | 6/1997 | Eick et al. | 345/440 |
| 5,644,692 A | 7/1997 | Eick | 345/326 |
| 5,710,899 A | 1/1998 | Eick | 345/764 |
| 5,742,777 A | 4/1998 | Eick | 345/787 |
| 5,751,931 A | 5/1998 | Cox et al. | 345/440 |
| 5,793,369 A | 8/1998 | Atkins et al. | 345/787 |
| 5,835,085 A | 11/1998 | Eick et al. | 345/853 |
| 5,845,119 A | * 12/1998 | Kozuka et al. | 717/2 |
| 5,847,972 A | 12/1998 | Eick et al. | 709/246 |
| 5,850,531 A | 12/1998 | Cox et al. | 345/781 |
| 5,867,713 A | * 2/1999 | Shrader et al. | 717/11 |
| 5,937,064 A | 8/1999 | Eick et al. | 707/101 |
| 5,945,990 A | 8/1999 | Morrison et al. | 345/748 |
| 5,945,998 A | 8/1999 | Eick | 345/431 |
| 5,949,415 A | * 9/1999 | Lin et al. | 345/335 |
| 5,999,192 A | * 12/1999 | Selfridge et al. | 345/440 |
| 6,100,887 A | * 8/2000 | Bormann et al. | 345/339 |
| 6,125,375 A | 9/2000 | Atkins et al. | 707/502 |

OTHER PUBLICATIONS

"Layout Algorithm for Computer Network Graphics," IBM Technical Disclosure Bulletin, vol. 30, No. 12, May 1, 1988, Armonk, U.S. pp. 268–277.

R. A. Becker et al., "Graphical Methods to Analyze Network Data," Proceedings of the IEEE International Conference on Communications (ICC '93); May 23–26, 1993, Geneva, Switzerland.

S. G. Eick, "Visualizing Large Software Systems," Proceedings of the Section on Statistical Graphics of the American Statistical Association, 1992, pp. 1–11.

S. G. Eick et al., "Seesoft—A Tool for Visualizing Line Oriented Software Statistics," IEEE Transactions on Software Engineering, vol. 18, No. 11, Nov. 1992, pp. 957–968.

R.A. Becker et al., "Visualizing Network Data," IEEE Transactions on Visualization and Computer Graphics, vol. 1, No. 1, Mar. 1995, pp. 16–28.

S. G. Eick et al., "Visualizing Corporate Data," AT&T Technical Journal, Jan./Feb. 1996, 13 pages.

T. Ball et al., "Software Visualization in the Large," Computer, vol. 29, No. 4, Apr. 1996, pp. 33–42.

L. S. Goller, "Visualizing Phone Fraud," Bells Labs News, Jun. 3, 1996, p. 3.

A. Lynch, "Characters in the code," Computers, The Cutting Edge, The Australian, No. 9891, Jul. 16, 1996, p. 5.

Trends, Trends & Developments, Bell Labs Technology, vol. 1, No. 2, Sep. 1997, pp. 2 and 7.

Visual Insights brochure, Dec. 1997, 6 pages.

Aberdeen Group, Inc., "Visual (and Competitive–Advantage) Insights," Dec. 8, 1997, 2 pages.

\* cited by examiner

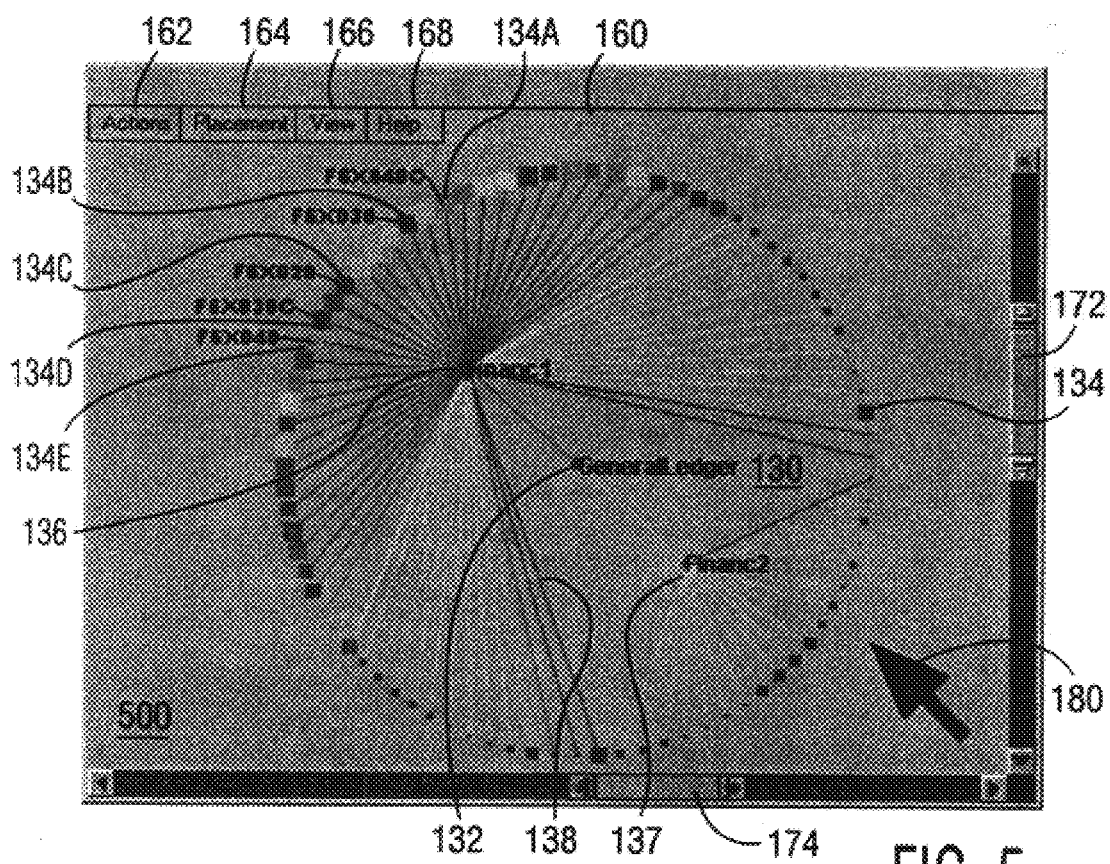
FIG. 5
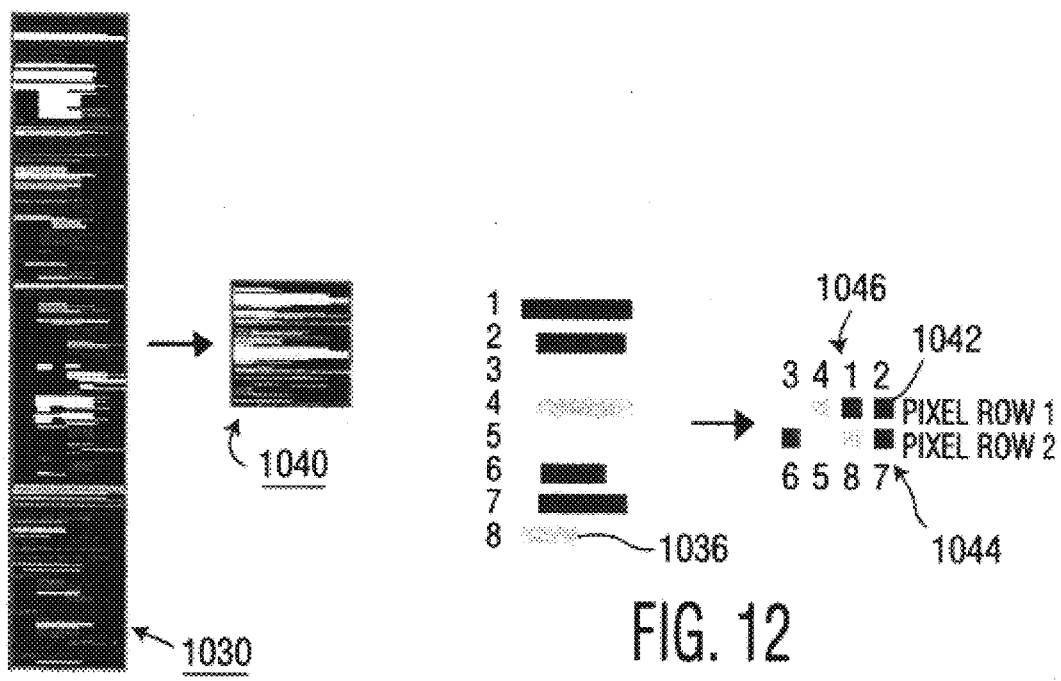
FIG. 11
FIG. 12

SYSTEM FOR VISUALLY REPRESENTING MODIFICATION INFORMATION ABOUT AN CHARACTERISTIC-DEPENDENT INFORMATION PROCESSING SYSTEM

BACKGROUND OF THE INVENTION

1. Field of Invention

This invention is generally directed to representing information derived from analyzing an information processing system, such as a suite of software programs. More particularly, this invention is directed to a system and apparatus for analyzing and displaying information about characteristic-dependent portions of an information processing system.

2. Description of Related Art

As has been widely discussed in the popular media, the impending century change, i.e., the change in years in which the first two digits of the year number are "19" to years in which the first two digits of the year number are "20", is anticipated to cause many legacy information processing systems to crash. That is, many legacy information processing systems have many date-dependent portions that will not be able to handle the century change. Legacy information processing systems include many large suites, software portfolios or software applications that were written in programming languages that are no longer commonly used. When these legacy software applications were written, both processing resources and memory were extremely expensive. Accordingly, to reduce both processing costs and memory usage, many legacy software applications encoded year information in date-dependent portions of the software applications using only the last two digits of the year. In particular, if a date can be represented as "CCYYMMDD" where "CC" is the century information, "YY" is the year of the century information, "MM" is the month of the year information and "DD" is the day of the month information, many legacy software applications encoded only the year information "YY" and did not encode the century information "CC". This was considered a proper programming technique at the time, as no one at the time expected these legacy software applications to be used beyond the year 1999.

However, as has been widely reported, many legacy software applications will be used well into the next century. However, because the century information is not encoded into the date information used by such legacy software applications, these programs will assume the year encoded "00" is the year "1900" rather than the year "2000". This erroneous assumption will cause many data processing errors. If such legacy software applications include billing or accounting programs, many erroneous bills and other erroneous accounting information will be generated.

Accordingly, information system managers charged with maintaining such legacy software applications need to at least update these legacy software applications so that the dates encoded in the date-dependent portions of these software applications include the century information "CC". Currently, there are five popular strategies that can be used to repair such legacy software applications: 1) date field expansion; 2) code correction; 3) windowing; 4) ad hoc repairs; and 5) replacing one or more systems, subsystems or individual programs of the legacy software application. Date field expansion involves adding two digits to all date fields and modifying the code that accesses these date fields. Code correction involves encoding the century information in the original six digits of the date fields and modifying the program statements accordingly. Windowing refers to inserting code around every statement involving dates that imputes the appropriate century, as a function of the current date and window size. Ad hoc strategies include post-processing or reversing the system clock using a 28-year or 100-year windowing time bridge. Furthermore, since repair strategies must be consistent between systems of the legacy software application that use common data, it is impossible to determine the best approach by investigating only one system or subsystem of a large legacy software application that has numerous systems, subsystems, and individual programs.

Due to the passage of time, many of the third-party vendors that created these legacy software applications no longer exist. Therefore, the owner of the legacy software application cannot turn to such third-party vendors to repair the legacy software application. Further complicating the legacy software problem, for those third-party vendors that are still in business, most of the programmers who created the legacy software applications have retired or otherwise no longer work for the third-party vendor. Moreover, even if one or more of the particular programmers that created a particular legacy software application can be located, it is unlikely they retain any detailed knowledge about programs written 25 to 35 years previously. Thus, while selection of a particular repair strategy could be easily made and a particular tactical plan for implementing the repair strategy could be developed given sufficient detailed information or an intuitive understanding of the operation of the legacy software application, it is extremely unlikely that an information system manager will have access to such detailed information or to a person having an intuitive feel for the operation of the legacy software application. Furthermore, generating sufficient information to determine the appropriate strategy and to prepare the tactical implementation of the appropriate strategy through a detailed inspection of the source code of the legacy software application is too time consuming and expensive for all but the smallest legacy software applications.

Thus, a tool is needed that can analyze a legacy software application and extract and display information about the date-dependent portions of the legacy software application, and that can display such information in a way that allows an information system manager to gain an intuitive feel for the legacy software application and to determine and implement the appropriate repair strategy.

SUMMARY OF THE INVENTION

This invention provides a software visualization technique for visually analyzing an existing software application requiring application-wide revisions and for identifying programming consequences resulting from the required revisions.

This invention also provides a software visualization system that displays information about characteristic-dependent portions of a software application.

This invention further provides a software visualization system that allows assessment and strategic planning for determining the extent of the impact of changing a software application and formulating repair strategies.

This invention additionally provides a software visualization system that displays information about the characteristic-dependence of systems, subsystems and individual programs of a software application that allows an intuitive understanding of the structure of the software application.

These and other features and advantages of this invention are described in or are apparent from the following detailed description of the preferred embodiments.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The preferred embodiments of this invention will be described in detail, with reference to the following figures, wherein:

FIG. 5 shows the system of FIG. 3, where the programs and subsystems are color-coded as a function of the McCabe complexity metric using a pastel color scheme;

FIG. 11 shows a minimal line representation of a software program corresponding to the minimal representation shown in FIG. 10 and the corresponding minimal pixel representation;

FIG. 12 shows how the minimal line representation is converted to the minimal pixel representation;

DETAILED DESCRIPTION OF PREFERRED EMBODIMENTS

Figure 1:
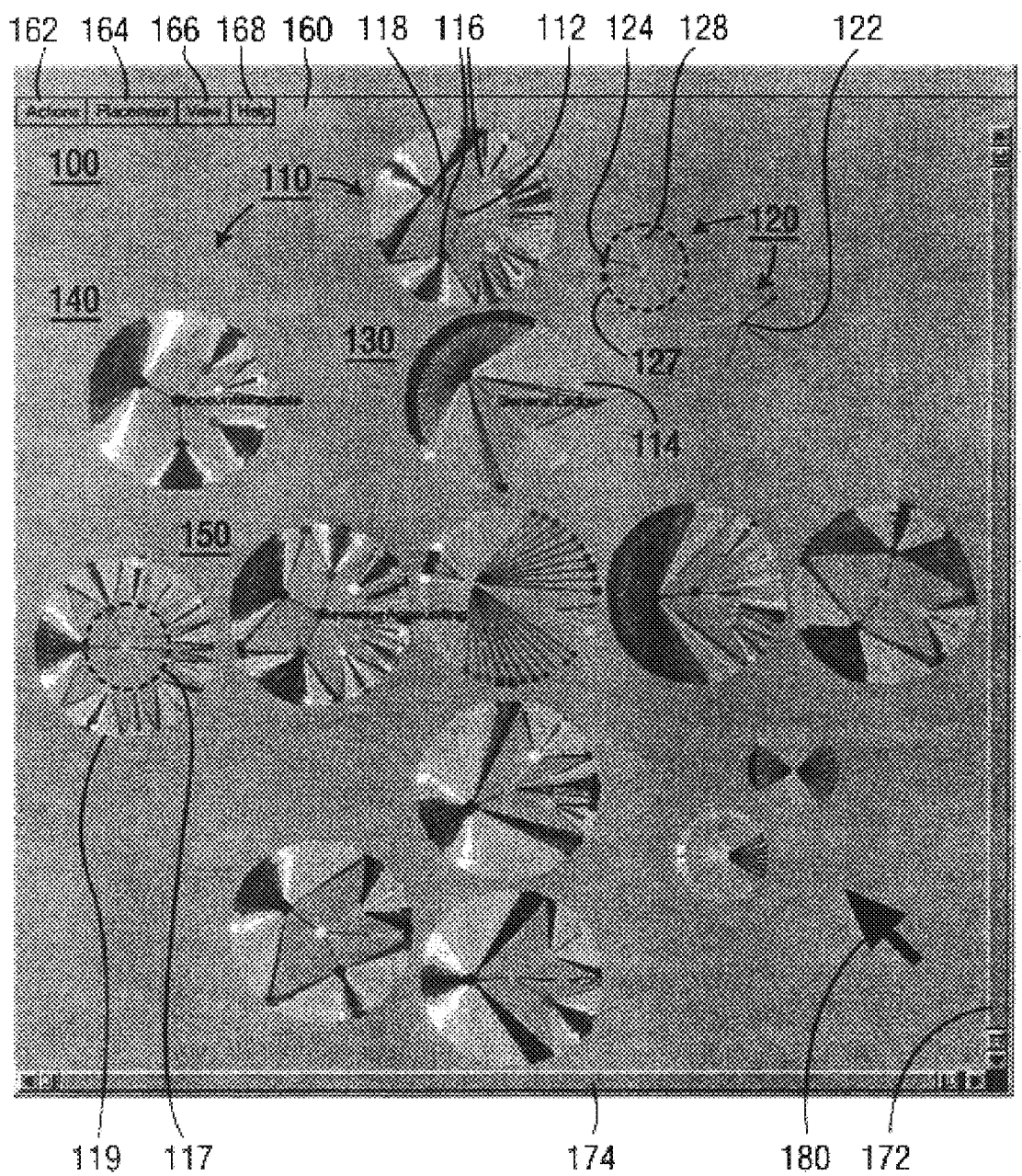
FIG. 1 is an overview of an exemplary legacy software application, where each system of the legacy software application is represented as a connected graph and is color-coded as a function of the characteristic-dependence of the subsystems and individual programs forming the systems of the legacy software application according to this invention.

This invention provides a software visualization technique for visually analyzing an existing software application requiring application-wide revisions and for identifying programming consequences resulting from the required revisions. "Legacy" software applications are those software applications that are written in obsolete or no longer common software languages, were written by third-party vendors that no longer exist and/or by programmers no longer associated with the third-party vendors, and/or are poorly documented. In such legacy software applications, the programmers charged with revising the legacy software applications must look through large volumes of source code, much of which has not been modified in many years, both to identify the faulty lines and to formulate repair strategies and tactics.

One problem in maintaining large legacy software portfolios or applications that can contain many independently operating systems, each of which contains one or more interdependently operating subsystems and can include tens to hundreds of individual programs, is that it is difficult for those charged with maintaining such legacy software portfolios or applications to gain an intuitive feel for how application-wide changes affect the various systems, subsystem and individual programs of the legacy software portfolio or application and where problems arising from such system-wide changes are focused. While the following discussion is directed to a software application that has a number of interrelated systems, functionally linked by operating on a common database or some other common element, the system and method of this invention are equally applicable to software portfolios of unrelated software. In such unrelated software cases, the invention provides the additional benefit of allowing the analyst to determine which applications of the software portfolio being analyzed present the most significant problems or challenges, and thus allows the analyst to organize how the various applications will be treated.

In the following discussion, the particular system-wide change to the legacy software application discussed is directed to illustrative embodiments for changing the legacy software application so that century information is also included in the year information. Advantageously, in accordance with the invention, the legacy software application can be repaired to function effectively in view of the impending century change. However, the various visualization tools described below are not limited to the legacy software problem of the illustrative embodiment discussed herein. Rather, these visualization tools can be used to visualize how any system-wide change to a software application impacts that software application.

For example, the visualization tools described below can also be used to assess and locate changes made to programs by a particular programmer or by a particular modification request, assess and locate programs in a legacy software application that are no longer in production use and thus can be discarded or archived. Thus, the visualization tools described below can also be used to identify and assess code changes related to conversion and/or correction of software to support a new monetary system, such as the "Euro" conversion currently occurring in Europe, where a new currency is being introduced in addition to, and eventually in place of, existing national currencies. The visualization tools described below can also be used to identify and assess code changes related to conversion and/or correction of software to accommodate extended postal codes, such as the change from 5 to 9 digit "ZIP" codes in the U.S. The visualization tools described below can also be used to identify and assess code changes to a software portfolio made over time to understand where the portfolio has been changed, what features have been added, augmented or deleted, and by which developers and/or programmers. In general, the visualization tools described below can be used to identify and assess code changes related to any characteristic or attribute about the code, such as date dependence or some other type of dependence, or information such as modification date, number of modifications or maker of modification.

As previously discussed, one of the most significant current information technology problems involves the century change conversion that must be made to many legacy software applications. Many such legacy software applications were originally designed to store dates using only two digits (YY), representing the last two digits of the year, presuming that the century will always be "19" for the useful life of the software application. Thus, such programs will fail at the century change between the twentieth and twenty-first centuries and must be repaired as described above. The invention uses pattern matching, heuristics and data flow analysis as a function of language-specific parsing tools to identify the date-dependent lines. Unfortunately, while software-specific tools for such general heuristics and data flow analysis are known, the amount of output these software-specific tools produce becomes overwhelming for all but the tiniest legacy software applications. Advantageously, this invention provides a number of software visualization tools that allow an analyst to easily and efficiently manage this information. In particular, an embodiment of this invention provides a number of software visualization tools that show the impact of the century change on date-dependent lines at the application, system, subsystem and program levels, and even in the lines of code of the legacy software application. This enables analysts to develop efficient conversion strategies and track the conversion progress.

While conventional software maintenance problems can be solved using incremental enhancements, this is not possible with system-wide problems, such as the century conversion. Century conversion of legacy software applications cannot be done incrementally, because the century conversion problem affects all portions of the legacy software application that access common data stores. These include legacy software applications that comprise suites of programs that communicate via common formats, or legacy software applications that comprise programs that access common databases.

Thus, revising a legacy software application so that it can properly deal with the century change requires that the solution be deployed simultaneously throughout the various systems and subsystems of the legacy software application. Otherwise changing common data may have unwanted side effects and will break existing programs. In addition, many of the software applications affected by the century change problem are legacy software applications and thus have the additional problems outlined above.

Furthermore, the century change problem is more subtle than merely using a "YYMMDD" format to encode a date that is more properly represented as "CCYYMMDD". In particular, there are three broad classes of errors involved in the century change problem, including:

1) using a two digit number "YY" to represent a four digit year "CCYY", causing failures in sorting, comparison and database access;
2) failing to correctly recognize leap years for years divisible by 400, such as the year 2000; and
3) hard encoding of magic values such as "99", "19" or "00", or using these as reserved values.

The above-described leap year problem arises because, as is well-known, leap years occur every four years, except for years ending in "00", unless such a year ending in "00" is divisible by 400. That is, years ending in "00" are not normally leap years, unless the year is also divisible by 400, in which case that year is a leap year.

When a legacy software application must be converted to properly function in view of the century change, there are four broad stages in the conversion process. These include:

1) assessing and strategically planning to determine the extent of the century change impact on a legacy software application and to formulate repair strategies;
2) converting and renovating the source code of the legacy software application;
3) monitoring and tracking the quality of the code conversion and renovation; and
4) testing and validating the code conversion and renovation.

The impact assessment and strategic planning stage specifically involve: creating an inventory of the software assets, assessing the technical quality of the software assets, determining the strategic systems of the legacy software application, developing one or more high-level conversion strategies, identifying migration issues, and creating a tactical conversion plan. The possible conversion strategies can include: replacing the legacy software application or one or more of its systems, subsystems or programs, a full conversion of the legacy software application, a minimal conversion of the legacy software application, or even discarding the legacy software application, or discarding one or more of its systems, subsystems or programs.

The software visualization tools outlined below are directed to the assessment and strategic planning stage. These software visualization tools are described with respect to an exemplary legacy software application that includes a 10-million line inventory of COBOL code. As will be appreciated, COBOL is a well-known programming language used in business applications. Furthermore, the various software visualization tools outlined below use as an input the output of commercially available COBOL parsing tools. One application of such parsing tools is attempting to identify every line that is potentially affected by the century change problem.

While extremely useful, these parsing tools produce an output volume for a multi-million line COBOL inventory that is overwhelming and daunting. In particular, an industry-derived average number of lines of a legacy software application affected by the century change problem is 3–4%. In contrast, the software visualization tools of the invention, when applied to present the information generated by the available COBOL parsing tools upon application to the exemplary legacy software application, resulted in an increased productivity by as much as 80% and improved the quality of the conversion by leading to more informed and efficient repair strategies.

Typically, in COBOL, the source code of a software application is organized into a 4-level hierarchy. This hierarchy includes:

1) systems such as "GENERALLEDGER" that are linked to key business functions;
2) subsystems of such systems, such as "FINANC1" and "FINANC2";
3) programs within such subsystems that perform particular tasks; and
4) the lines of code that form each program.

It should be appreciated that some legacy software applications are not complex enough to warrant the full four layers in the hierarchy. In this case, the subsystem level is often dropped, such that the systems are represented directly by programs within each such small system.

There are numerous commercial tools available that parse source code, such as COBOL code, and that produce two broad classes of output when applied to the illustrative embodiment. These classes of output include lists of potentially impacted lines tagged according to statement type, such as lists of potentially date-dependent or century-change-impacted lines, and source code complexity metrics for each program, subsystem and system. Such source code complexity metrics are described in *Software Complexity: Measures and Methods*, by H. Zuse, de Gruyter, Berlin, 1991, herein incorporated by reference in its entirety.

In addition, the preferred embodiments of the software visualization tools of this invention described below preferably use as their input the output of "COBOL Analyst 2000™" parsing tool available from the SEEC Corporation, of Pittsburgh, Pa. (herein referred to as "COBOL ANALYST"). COBOL ANALYST tags the date-dependent or century-change-affected lines with the tags "DC" for declarations, "DO" for data operations, such as initialize, inspect, examine, evaluate, and search statements; and "DX" for data transfers, such as move and preprocessor statements. In particular, knowing the relative numbers and locations of the "DC", "DO" and "DX" tagged lines is useful in identifying the most-efficient conversion strategy.

A large variety of complexity metrics have been proposed in the literature. Tools for calculating these metrics are widely available. For example, COBOL ANALYST calculates six widely-used metrics:

1) the number of lines, including blank lines and comments;
2) the number of paragraphs, including those contained in copybooks;
3) Halstead's volume measure of program length, eliminating effects caused by comments, blank lines, and data-name lengths;
4) McCabe's cyclomatic complexity;
5) McCabe's essential complexity; and
6) McClure's control variable complexity.

These metrics are useful for identifying the programs and subsystems containing the bulk of the source code, and for highlighting source code with complex logic or subtle control structures. In general, the complexity metrics for source code tend to be correlated with each other and with program length.

More particularly, Halstead's volume measure of program length provides for accurate size comparisons between programs and is described in *Elements of Software Science*, M. H. Halstead, Elsevier, N.Y. 1997, herein incorporated by reference in its entirety. McCabe's cyclomatic complexity measures the number of paths through the system as a function of a flow chart representation. McCabe's essential complexity measures program well-structuredness. It is derived from the cyclomatic complexity by removing all edges used in structured constructs. Both of these metrics are described in "A Complexity Measure", P. J. McCabe, IEEE Transactions on Software Engineering, Volume 1, No. 3, pages 312–327, 1976, herein incorporated by reference in its entirety.

In general, as used herein, the term statistics includes both statistics, such as structural statistics, and metrics. In general, statistics refer to qualitative variables, and structural statistics refer to statistics derived from the structure of the software, such as the characteristics or attributes of the software, including the types of operations performed by a line of the software, etc. In general, metrics refer to quantitative measures about the software, such as the metrics outlined above.

One of the key features of the software visualization tools of this invention is that for analyzing application-wide conversion problems, no single view by itself is used to develop the repair strategy. Thus, the software visualization tools of this invention provide a suite of tightly-coupled, linked views, where each view is engineered for a particular task. In particular, these linked views, when working together, are more powerful than each view working individually, or all views working individually. Moreover, each view is interactive and functions both to display information and as an analysis environment. In accordance with the invention, linking the views ensures that interactive operations such as labeling, filtering and focusing performed in one view propagates instantly to the others. These interactive operations are intuitive and reversible, and therefore encourage user exploration.

One method according to the principles of this invention involves analyzing an existing software structure to determine a plan for implementing a desired change to the software structure, such as to repair the software structure to function properly in view of the century change problem. This method includes identifying elements of the software structure, such as a software application or a portfolio of applications, or a system, subsystem or program of the software application, to be analyzed, identifying at least one programming consequence as a function of the desired change to the software structure, such as the lines that are dependent on an characteristic to be changed, analyzing the identified elements to obtain at least one statistic about the identified elements, such as those outlined below, rendering a view of at least one symbolic representation of at least one of the identified elements of the software structure as a function of at least one of the at least one programming consequence and the at least one statistic, and displaying the rendered view to a user. This method will be described in greater detail below with respect to FIGS. 19A–22, relative to the various symbolic representation views described below with respect to FIGS. 1–17 and the apparatus shown in FIG. 18.

FIG. 1 shows an application-wide view 100 of the exemplary legacy software application, including a number of large systems 110 and a number of small systems 120 having varying hierarchical organizations. Each system 110 is a three-level hierarchy that can be represented as a directed graph laid out hierarchically using two concentric circles 117 and 119, as shown in FIG. 1. In particular, FIG. 1 shows fifteen systems of the exemplary software application, of which eleven large systems 110 have this full three-level hierarchy. The four small systems 120 are significantly smaller, and contain only a two-level hierarchy, the system level and the program level, as described above. Each of the eleven large systems 110 includes a central node 112 representing that system. A number of subsystem nodes 116, representing the subsystems of the system, are arranged in the circle 117 around the central node 112. A number of program nodes 114, representing the various programs of the subsystems, are arranged in the circle 119 and are positioned outside of the circle 117. Links 118 connect the subsystem nodes 116 to the central node 112 and the program nodes 114 to the appropriate ones of the subsystem nodes 116. That is, each program node 114 is connected by a link 118 to the subsystem node 116 representing the subsystem that contains the program represented by that program node.

Similarly, each small system 120 includes a central node 122 that represents that subsystem. A number of program nodes 124, representing the programs of that system, are arranged in a circle 127 around the central node 122. The program nodes 124 are connected to the central node 122 by the links 128.

Figure 2:
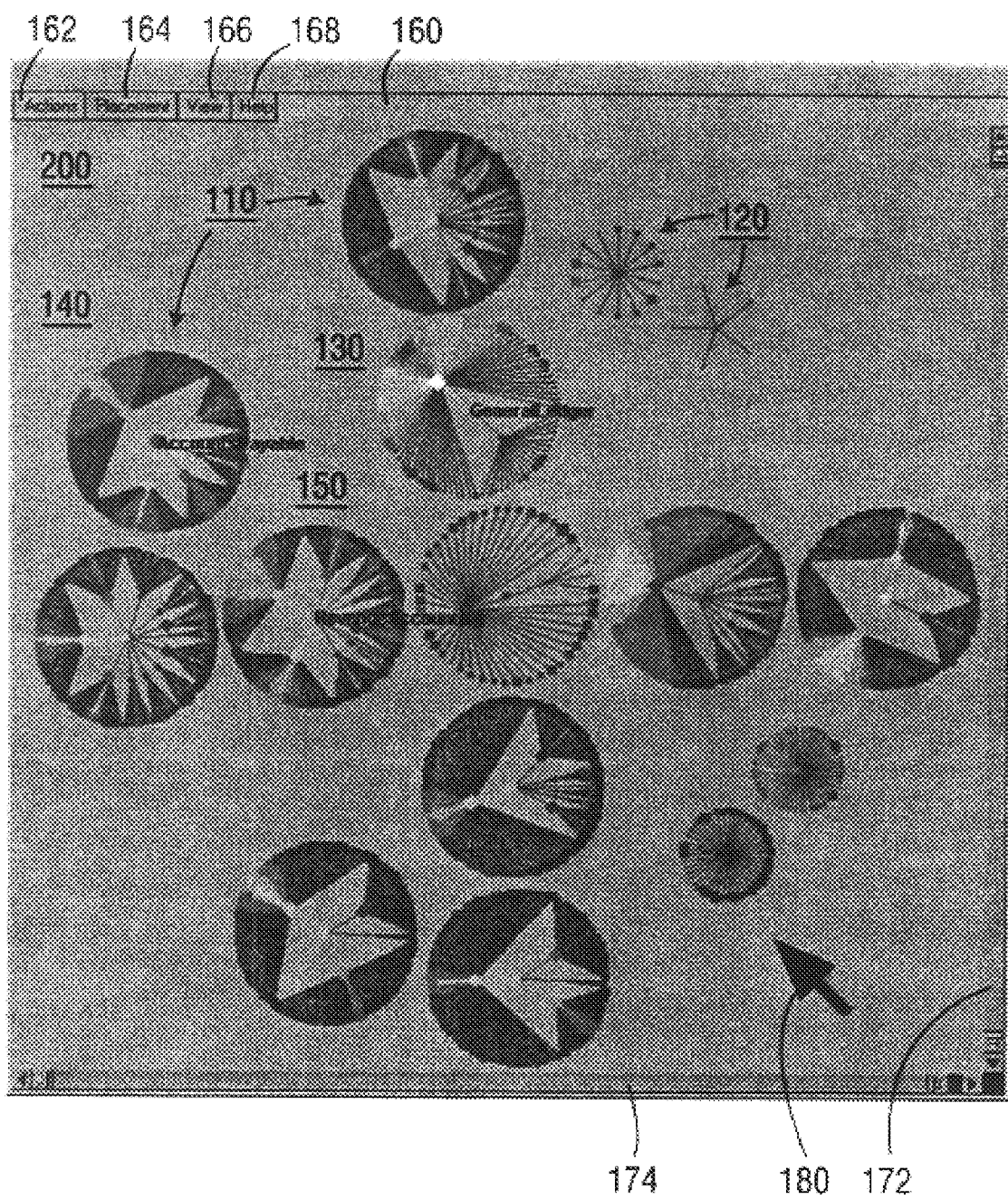
FIG. 2 is a second view of the exemplary legacy software application that ties the color-coding of FIG. 1 to the number of characteristic-dependent lines in the various programs and the subsystems of the various systems of the legacy software application.
Figure 3:
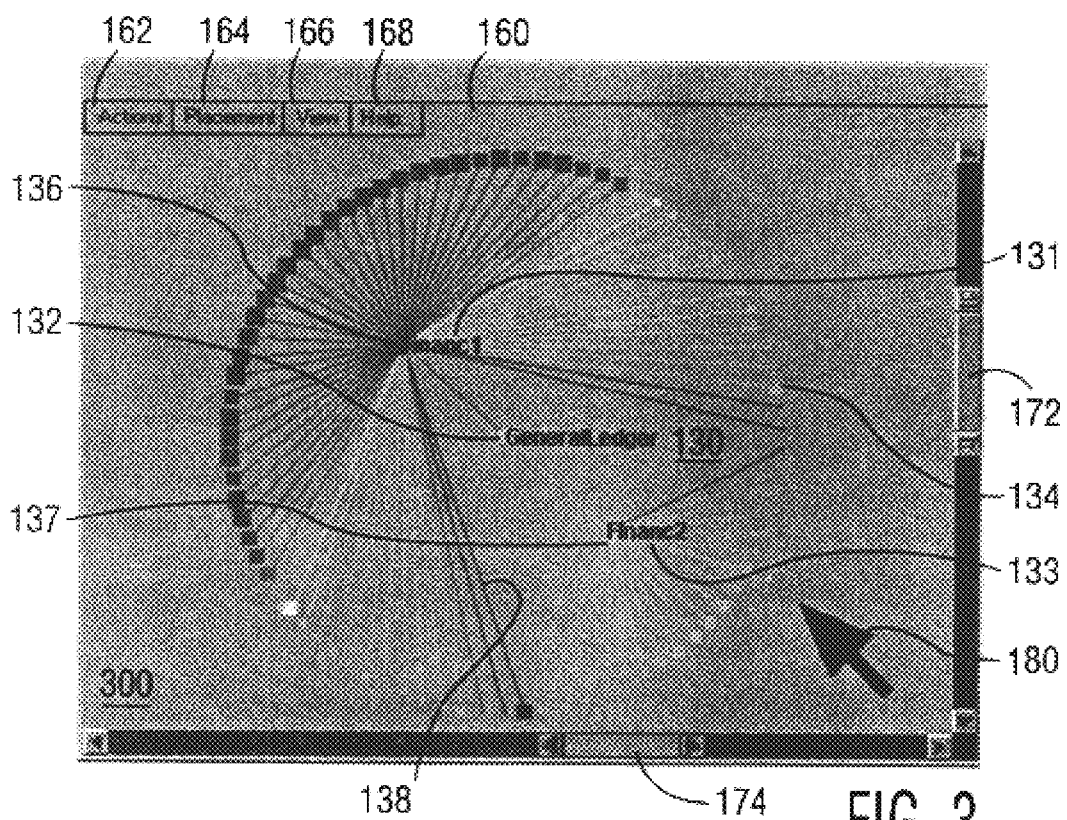
FIG. 3 shows an exemplary system of the legacy software application shown in FIGS. 1 and 2 that is color-coded to show the number of characteristic-dependent lines in the programs and subsystems of this system.
Figure 4:
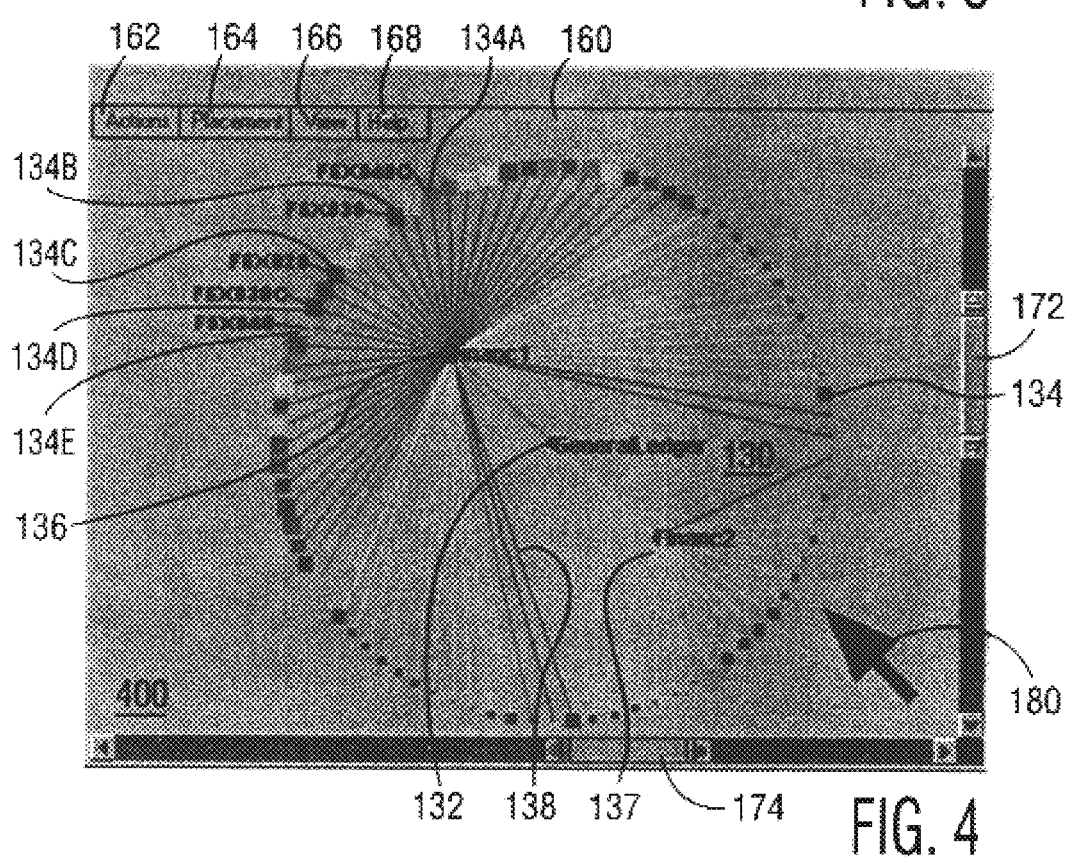
FIG. 4 shows the system of FIG. 3, where the programs and subsystems are color-coded as a function of the McCabe complexity metric and the links are color coded as a function of their characteristic dependence.

Furthermore, as shown in the application-wide views 100 and 200 of FIGS. 1 and 2, and more easily appreciated in the system level views 300 and 400 of FIGS. 3 and 4, the sizes of the nodes 114 and 124 representing the programs in each of these systems 110 and 120 encodes the number of lines in each program. Thus, the largest nodes 114 and 124 corresponded to the biggest programs, e.g., the largest programs in terms of lines of code. Because programs can vary in size from tens of lines to hundreds of thousands of lines or more, this huge variation in size makes it problematic to tie node size directly to program size. In FIGS. 1–4, the node sizes are scaled according to a binned program rank. While the preferred embodiment for normalizing the node sizes uses binning, other techniques are also useful. These include transforming using logarithms or square roots.

Binning involves dividing the number of elements, such as the programs of the legacy software application, into a number of equally-sized subsets. That is, each resulting subset has an equal number, or as equal a number as possible, of the elements to be binned. Binning according to rank involves first ranking the elements by some measure, such as size, and forming each subset so that no element of that subset has a rank that is between the ranks of two elements of some other subset. Thus, to bin eight elements into four subsets or "bins" according to their size rank, the two largest are placed onto the first bin, the next two largest are placed into the second bin, the next two largest are placed into the third bin, and the two smallest are placed into the fourth bin.

In particular, the programs of the legacy software application are, according to various embodiments of this invention, binned into 15 equally-sized groups according to size. Thus, the size of the node 114 or 124 for any program of the legacy software application is scaled according to the group number of that program. This prevents the largest files from visually dominating the application-wide views 100 and 200 shown in FIGS. 1 and 2 and the system level views 300 and 400 shown in FIGS. 3 and 4. A similar technique is used for color scaling and to scale the node sizes for the subsystem nodes 116 and the central nodes 112 and 122 as a function of cumulative statistics. Furthermore, as shown in FIG. 2, in some situations tying the size or color of the nodes 114 and 124 and/or links 118 and 128 to raw values is also appropriate. In particular, the software visualization tools according to this invention are interactive and allow for various scalings to be used and for views of the various scalings to be alternatively displayed.

As shown in FIGS. 1 and 2, there are three illustrative systems, the GENERALLEDGER system 130, the ACCOUNTSPAYABLE system 140 and the REVENUE-ACCOUNTING system 150, that stand out as being significantly date-dependent. By using the zoom bars 172 and 174, the application wide views 100 and 200 as shown in FIGS. 1 and 2 can be converted to the system-level views 300 and 400 shown on FIGS. 3 and 4.

Additionally, each of the views 100–500 shown in FIGS. 1–5 include a menu bar 160. The menu bar 160 includes an ACTION menu 162, a PLACEMENT menu 164, a VIEW menu 166 and a HELP menu 168. The ACTION menu 162 provides alternate modes of interaction with the displayed views. The PLACEMENT menu 164 provides various functions that arrange the nodes and the links in the displayed views. The VIEW menu 166 provides display options for the displayed view. The HELP menu provides interactive help to the analyst to aid in using and navigating through the various software visualization tools of this invention.

In particular, the ACTION menu 162 contains entries for invoking one or more of the following actions: "Read Position", "Write Positions", "Postscript", "Node Statistics", "Tie Link Selection", "Show Link If One Node" and "Mouse Select". The Read Position action reads a file containing a pre-computed graph placement. The Write Positions action writes the current graphs positions to a file for later retrieval. The Postscript action saves the current view graphics in the Postscript language for printing on a Postscripttype printer. The Node Statistics action calculates the selected statistics for the nodes as a function of the graph topology, such as, for example, number of links, number of links in to or out of a node, total link weight of the statistic or statistics assigned to the various nodes, in and out link weights, and average link weights. The Tie Link Selection action ties the selection of the links to the selection of the corresponding end nodes. The Show Link If One Node action selects the links if only one of the corresponding end nodes is selected. Normally, the links are selected only if both corresponding end nodes have been selected. The Mouse Select action allows the nodes and links to be selected using the mouse.

The PLACEMENT menu 164 contains entries for invoking one or more of the following actions: "Place On Circle", "Place On Hex Grid", "Place Using Tree", "Random Swaps", "Potential Is . . . ", "Fix Selection", "UnFix All", "Swap For . . . ", "Move For" and "Apart For . . . ". The Place On Circle action places all nodes on a circle. The Place On Hex Grid action places all nodes in a regular, hexagon-shaped grid of points. The Place Using Tree action places the nodes in a tree structure, with roots, twigs and leaves. The Random Swaps action randomly swaps nodes without changing the currently selected placement scheme. The Potential Is action allows the analyst to select a potential function that will be optimized by the selected placement scheme. The potential functions are equations that combine the weight statistic on a link and the distance between nodes joined by that link.

The Fix Selection action fixes the position of the currently selected nodes so that their placement will not be changed by any subsequent placement operations. The UnFix All action unfixes all fixed nodes. The Swap For action randomly exchanges nodes in the current placement, and keeps this exchange if the potential function selected using the Potential Is action is improved by the new positioning, or undoes the exchange if the potential function is not improved. This random exchange continues for the requested time period specified as the argument of the "for". The Move For action changes the locations of nodes to bring those nodes with high weight statistics on the link joining those nodes physically closer together. This movement continues for the requested time period specified as the argument of the "for". The Apart For action moves nodes slightly apart. This movement continues for the requested time period specified as the argument of the "for".

In particular, the VIEW menu 164 contains entries for invoking one or more of the following actions: "Select All", "Select One Step", "Select Component", "Select One Step Outgoing", "Select One Step Incoming", "Direct Links", "Gray Unselected", "Label All", "Labels Off" and "Label Selected". The Select All action places all nodes and links into the selected state, which in turn causes the nodes and links to be highlighted in the colors currently used to highlight selected objects. The Select One Step action increases the selection set by including those nodes that are reachable from the currently selected nodes by traversing a single link from any one of the currently selected nodes. The Select Component action increases the selection set by including all nodes that are reachable from a currently selected node by traversing any number of links from one of the currently selected nodes. The Direct Links action applies a direction, such as outgoing or incoming, from a first node to a second node, where the link will have an outgoing direction from the first node and an incoming direction to the second node. The direction is visually shown on the following views by adding an arrowhead to the link at the incoming node.

The Select One Step Outgoing action increases the selection set by including those nodes that are reachable from the currently selected nodes by traversing a single outgoing-directed link from any one of the currently selected nodes. The Select One Step Incoming action increases the selection set by including those nodes that are reachable from the currently selected nodes by traversing a single incoming-directed link from any one of the currently selected nodes. The Gray Unselected action shows the unselected nodes in gray. Normally, unselected nodes are not shown at all. The Label All action adds a textual label to all nodes and links identifying the node or link. The Labels Off action removes all of the labels added by the Label All action. The Label Selected action labels only the currently selected nodes and/or links.

It should also be appreciated that other methods of accessing these functions can be used. For example, the systems 110 and 120 could be selectable via a selection icon 180 controlled by a selection device (not shown) such as a mouse, a trackball, a touch pad, a keyboard, a pen-based device or the like. By selecting a system 110, the display can be toggled between the application-wide views 100 and 200 and the system-level views 300 and 400 of the selected system. Additionally, the system level views shown in FIGS. 3 and 4 can be scaled to show two or more systems 110 and/or 120, or only portions of a system 110 or 120. Additionally, assuming the display has sufficient space and resolution, two or more views 300, 400 or 500, or any combination of these views, can be shown on the display at one time. Furthermore, characteristics, such as node color, node size, and link color, that are mapped to statistical values, can be rescaled over the range of values represented by a selected subset of the nodes.

In dealing with application-wide repair processes, many factors are important in determining how to prioritize conversion of the various systems forming the application. For any particular system, these factors include, for example:

1) the criticality of that system;
2) the dependencies existing between that system and the other systems of the application; and
3) the complexity of the conversion process for that system.

These factors can be assessed and values given to each of them for each of the systems of the application using the application level views shown in FIGS. 1 and 2.

For example, in the application-wide view 100 shown in FIG. 1, the number of lines in the particular programs of the various large systems 110 and the various small systems 120 that are date-dependent, i.e., affected by the century change, are shown scaled from the highest number, shown in red, to the lowest number, shown in dark blue. In particular, four systems 110, including the "GENERALLEDGER" system 130, the "ACCOUNTSPAYABLE" system 140 and the "REVENUEACCOUNTING" system 150 have significant and widespread numbers of programs that are significantly affected. While most of the other systems 110 and 120 have at least one significantly-affected program, these programs are either highly localized or are much lower in number than the four most-significantly affected systems.

Furthermore, by converting to the "raw number of affected lines" mapping shown in the application-wide view 200 shown in FIG. 2, it becomes clear that the "GENERALLEDGER" system 130 contains the most significant date-dependence problem. As shown in FIG. 2, the programs having the largest raw, or unbinned, number of affected lines are shown in red and the programs having the smallest raw number of affected lines are shown in dark blue. Thus, as shown in FIG. 2, while the "ACCOUNTS-PAYABLE" system 140 has the highest raw number of lines affected, the binned number of strongly affected programs in the "ACCOUNTSPAYABLE" system 140, as shown in FIG. 1, is much lower than that of the "GENERALLEDGER" system 130. Furthermore, as shown in FIG. 2, the affected lines are much more evenly distributed among all of the programs of this system 140, in that all of the programs of the "ACCOUNTPAYABLE" system 140 are color-coded either dark blue or light blue. In contrast, the "GENERALLEDGER" system 130 contains all of the most significantly affected programs, as indicated by the red nodes in FIG. 2. Thus, by using the application-level views 100 and 200 shown in FIGS. 1 and 2, an analyst can quickly spot the systems 110 or 120 critical to the application-wide repair process. In this example, the single-most critical system of this illustrative legacy software application seems to be the "GENERALLEDGER" system 130, as it stands out by being both complex and strongly impacted.

Thus, the application-wide views 100 and 200 shown in FIGS. 1 and 2 are powerful and useful for a variety of reasons. First, these application-wide views 100 and 200 instantly show where the impact of the application-wide repair problem is focused. Second, these application-wide views 100 and 200 instantly show the numbers and relative sizes of the affected programs within each subsystem 114 and 124 and systems 110 and 120. Third, these application-wide views 100 and 200 are compact, scaleable and shrinkable. Thus, these application-wide views 100 and 200 can display the impact of an application-wide repair of very large code portfolios. In short, these application-wide views 100 and 200 provide a large-picture overview. They provide a broad indication of whether or not the impact is concentrated or spread uniformly, and how it affects any particular system. These application-wide views 100 and 200 also show the relative sizes of the systems 110 and 120, which systems 110 have subsystems 116, and which systems 110 and 120 and subsystems 116 have the most programs 118.

Once a critical system 110 or 120 has been identified using the application-wide views 100 and 200 shown in FIGS. 1 and 2, an analyst can then zoom in on that important system 110 or 120 to show it in greater detail, as shown in the system-level views 300–500 shown in FIGS. 3–5. In particular, the system-level views 300 and 400 of FIGS. 3 and 4 show the "GENERALLEDGER" system 130 in greater detail. The "GENERALLEDGER" system 130, represented by the system node 132, includes two subsystems, the "FINANC1" subsystem 131, represented by the subsystem node 136, and the "FINANC2" subsystem 133, represented by the subsystem node 137. In particular, the "FINANC1" subsystem 131 includes sixty-four programs, while the "FINANC2" subsystem 133 contains eighteen programs. As shown in FIG. 3, the program, subsystem and system nodes 134, 136 and 137, and 132, respectively, and the links 138 between the nodes 132, 134, 136 and 137, are color-coded to show the binned number of affected lines. In addition, the node sizes are representative of the size of the corresponding program.

In FIG. 3, the red-colored ones of the nodes 134 and the red-colored ones of the links 138 indicate those programs having the largest number of affected lines, while the blue-colored ones of the nodes 134 and the blue-colored ones of the links 138 indicate those programs having the smallest number of affected lines. In contrast, the system-level view 400 of FIG. 4 shows the nodes 134 of the "GENERALLEDGER" system 130 color-coded as a function of the cyclomatic complexity metric for the various programs 134. Similarly to FIG. 3, in FIG. 4, the red-colored ones of the nodes 134 indicate the programs having the highest complexity, while the blue-colored ones of the nodes 134 indicate the programs having the lowest complexity.

Furthermore, in FIGS. 1–4, a rainbow-colored spectrum is provided to color-code the nodes corresponding to the programs between the highest binned or valued programs and the lowest binned or valued programs. As shown in the system-level view 500 shown in FIG. 5, this invention provides users with the ability to alternately use a perceptually-uniform pastel color scale. In addition, a gray-level color scale and various other scales (not shown) can also be used. Both of these alternative color coding schemes are better-suited for the color-impaired. However, the rainbow scale shown in FIGS. 1–4, with red color coding indicating the most significant nodes, is preferred, as it is intuitively understood by potential users and red-encoded nodes and links are immediately understood by potential users as problem areas.

In addition, while the nodes 134 are encoded using the cyclomatic complexity measure in the system-level view 400 of FIG. 4, the links 138 in the system-level view 400 of FIG. 4 are encoded with the binned number of affected lines, as in FIG. 3. That is, the encoding of the nodes 134 and links 138 can be tied to different metrics. This makes it easy to identify, for example, complex programs that also have significant numbers of strongly affected lines.

Looking closely at the system-level views 300 and 400 of FIGS. 3 and 4, the system-level view 300 of FIG. 3 shows that the "GENERALLEDGER" system 130 stands out because its larger subsystem, the "FINANC 1" subsystem 131, represented by the node 136, contains many date-intensive programs. Furthermore, color-coding by the cyclomatic complexity of the programs, as shown in the system-level view 400 of FIG. 4, shows that five of the date-intensive programs of the "FINANC1" subsystem 131 are both large and highly complex. These five programs are the "F6X040C" program, represented by the node 134A, the "F6X030" program, represented by the node 134B, the "F6X020" program, represented by the node 134C, the "F6X030C" program, represented by the node 134D and the "F6X040" program, represented by the node 134E. Thus, these programs, represented by the nodes 134A–134E, are likely to be particularly costly to repair.

According to this invention, after visually analyzing the entire application or portfolio using the views 100 and 200 shown in FIGS. 1 and 2, and particular ones of the systems using the views 300–500 shown in FIGS. 3–5, alternately with these views, or instead of these views, the analyst can use a linked interactive graphic view to further visually analyze the various such systems and programs of the software application or portfolio identified as being particularly complex, or particularly affected by the desired change, or both.

Figure 6:
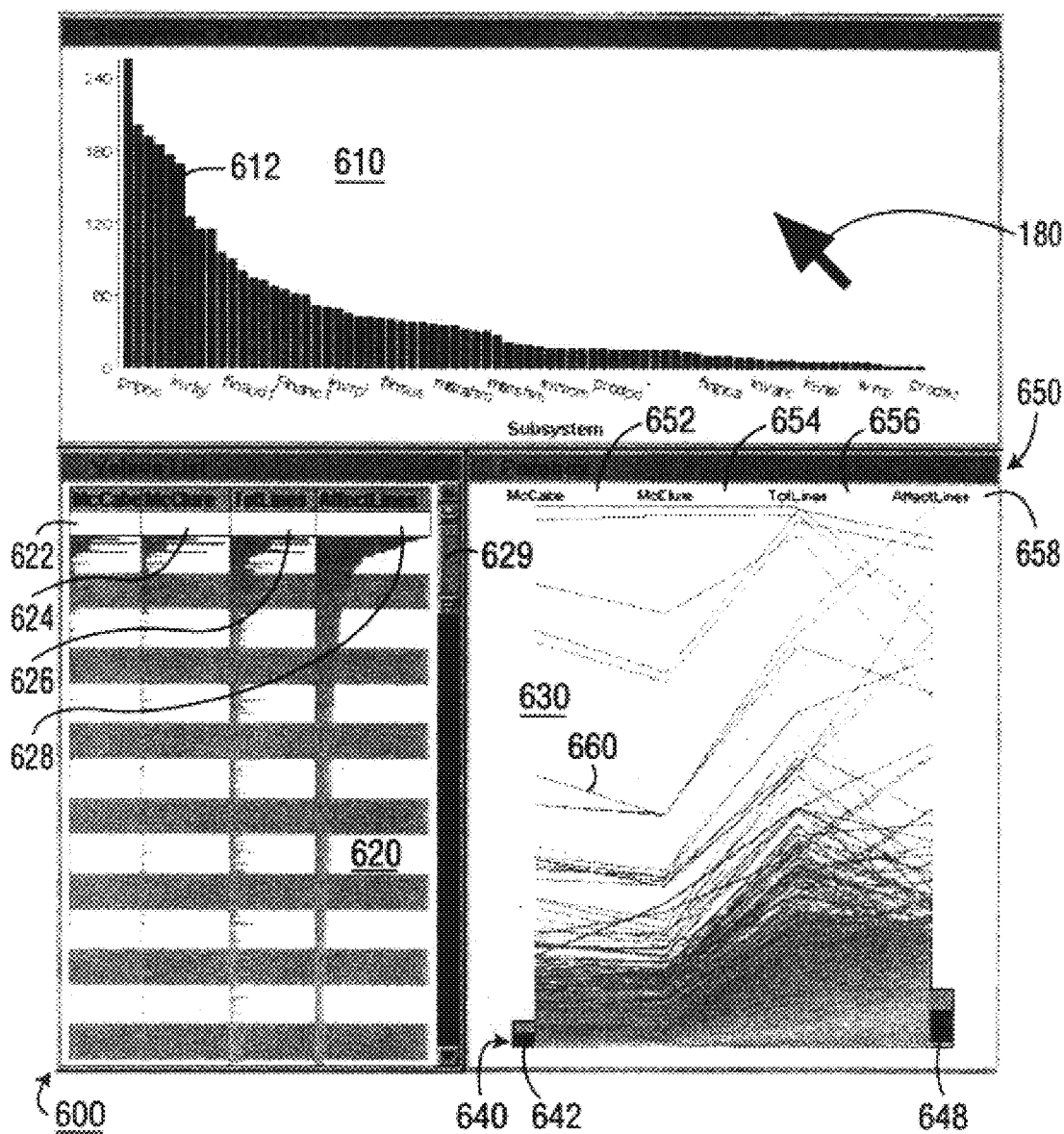
FIG. 6 shows a linked interactive graphic view according to the principles of this invention, comprising a bar chart, a collapsed values list, and a parabox.
Figure 7:
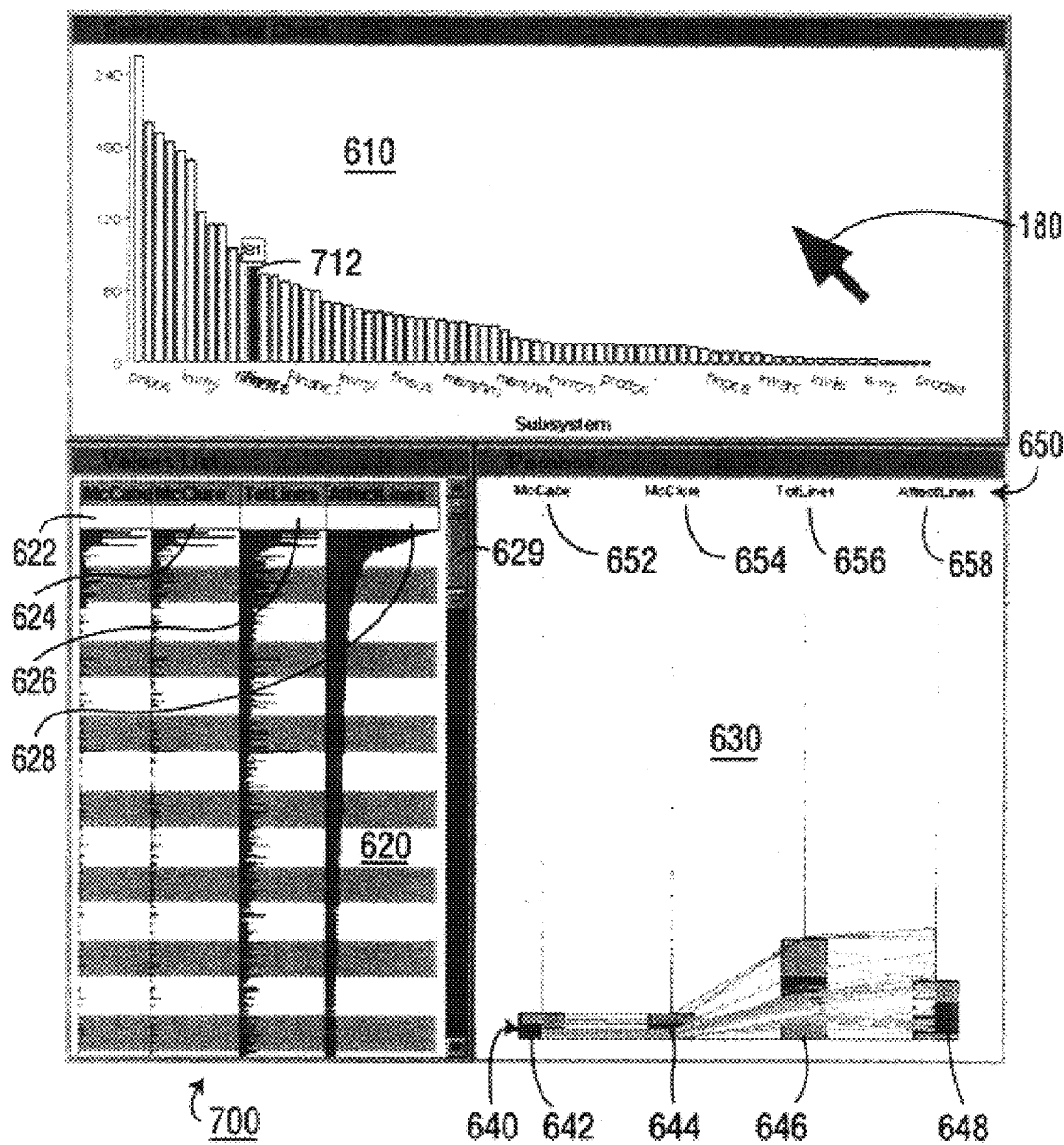
FIGS. 7 and 8 are two frames of an animation over the subsystems shown in FIG. 5 showing the particular statistics for the constituent programs of each of two of the subsystems.
Figure 8:
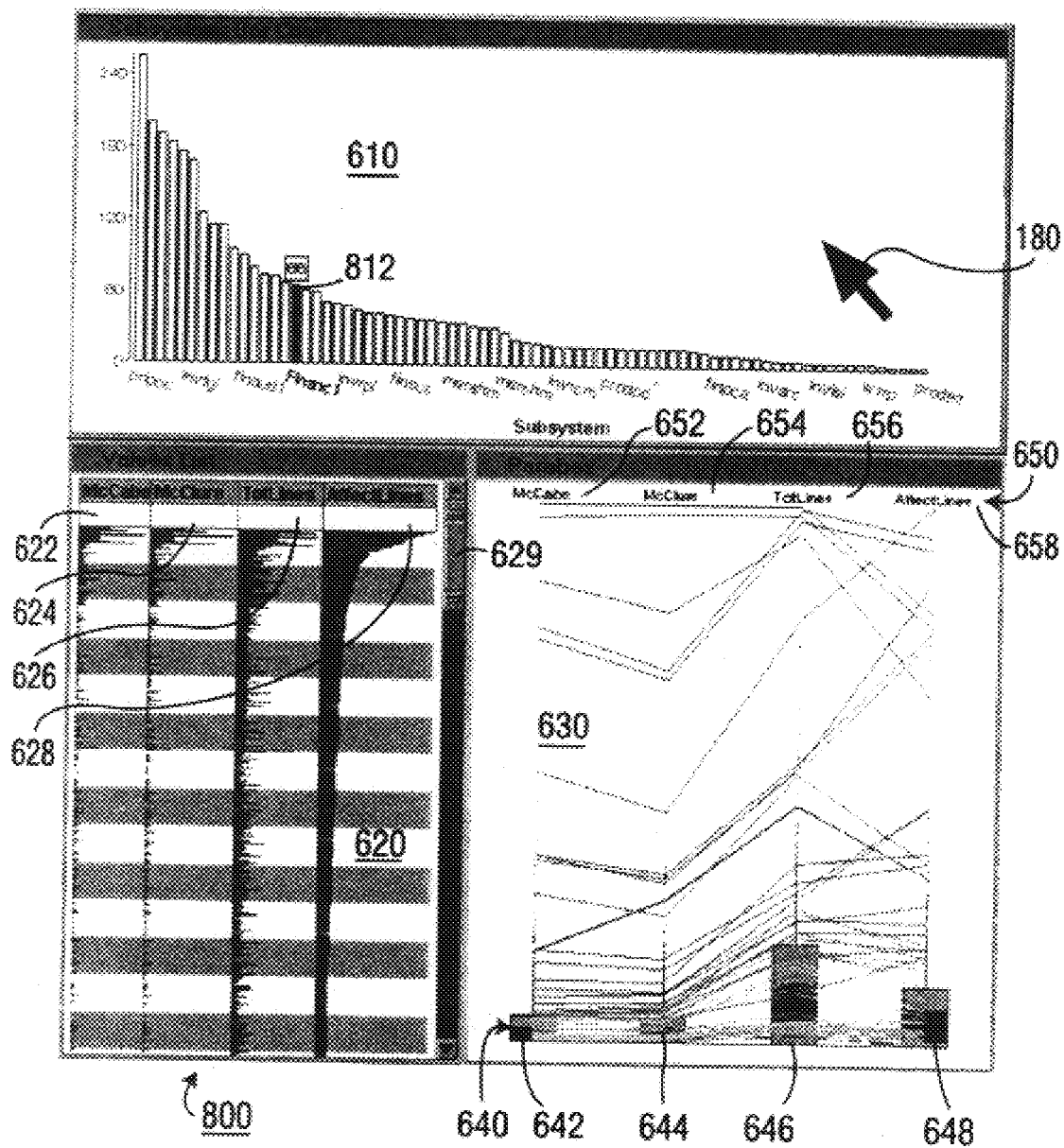

FIGS. 6–8 show this linked, interactive graphic view. The linked, interactive graphic views 600–800 shown in FIGS. 6–8 are complementary to, and linked to, the application-wide views 100 and 200 and the system-level views 300–500 shown in FIGS. 1–5. In particular, the link-interactive graphics views 600–800 shown in FIGS. 6–8 include a bar chart 610 at the top, a collapsed values list 620 at the bottom left and a parabox plot 630 at the lower right. A parabox plot is a combination of a box plot and a parallel coordinates plot.

In FIGS. 6–8, each bar 612 of the bar chart 610 represents one of the subsystems of the large systems 110 or one of the small systems 120 of the exemplary legacy software application. As shown in the bar chart 610 of FIGS. 6–8, the height of each bar 612 is proportional to the numbers of the programs 114 in each of the subsystems 116, sorted in decreasing order. For each program 114 in the legacy software application, the collapsed values list 620 shows both the McCabe complexity metric 622 and the McClure complexity metric 624, the total number of lines 626, and the total number of affected lines 628. It should be appreciated that, while FIGS. 6–8 show the collapsed values list 620 using the above-outlined metrics and statistical values for the software subsystem, the collapsed values list 620 can be used to show collapsed values for any metric and/or any statistic for which values have been obtained. That is, the analyst can interactively change the displayed metrics and statistics to any metric and/or statistic for which the analyst has generated data for the software application being displayed.

By manipulating the zoom bar 629 of the values list 620, the user can expand or collapse the values list 620 shown in FIG. 6 to control the height consumed by each line of data. In the views 600–800 shown in FIGS. 6–8, the values list 620 has been collapsed so that each line of data is shown as a one-pixel high row. Furthermore, the rows have been sorted in decreasing order according to the number of affected lines 628. The length of each row encodes the value of the corresponding metric.

Importantly, in accordance with this invention the values list 620 is extremely flexible. For example, users can zoom in to view easily readable textual output and can zoom out so that each line is reduced to a single row of pixels. Regardless of the zoom level, the length of the line of data for each metric is proportional to the value of that metric for that line. As the values list 620 is moved between these two extremes, the font sizes shift smoothly for a continuous transition. Zooming out fully condenses the list so that everything fits into a single fixed-sized non-scrollable window.

The parabox plots 630 shown in FIGS. 6–8 show the same four statistics as the values list 620. As shown in FIGS. 6–8, the box plot 640 includes a McCabe complexity metric box 642, a McClure complexity metric 644, a total number of lines box 646 and a number of affected lines box 648. Similarly, the parallel coordinate plot 650 includes a McCabe complexity metric scale 652, a McClure complexity metric scale 654, a total number of lines scale 656 and an affected number of lines scale 658. As described above with respect to the collapsed values list 620, the selected metrics and statistics displayed in the parabox plot 640 can be interactively changed by the analyst to display any metric and/or statistic for which the analyst has data for the current subsystem. Preferably, the parabox plot 640 and the collapsed values list 620 are linked, so that changing the selected metrics and statistics in one will change the selected metrics and statistics in the other.

Importantly, in accordance with this invention, as set forth above, the parabox plot 630 is a combination of a parallel coordinates plot 650 overlaid on the box plot 640, although the box plots 644 and 646 are almost completely obscured in FIG. 6. Combining the box plot 640 and the parallel coordinates plot 650 is particularly useful since the box plot 640 is ideal for showing the variable distributions and the parallel coordinate plot 650 excels at showing multi-variant relationships. By combining them into the single parabox plot 630, both the distribution and the multi-variant relationships can be viewed simultaneously. Thus, the parabox plot 630 is particularly useful for detecting multivariant outliers.

One of the features of the software visualization tools of this invention is providing an animation over the subsystems 612. In this animation feature, each of the various subsystems 612 is individually highlighted in the bar chart view 610 and the corresponding programs 114 and 124 are highlighted in the values list view 630 and shown in the parabox view 630. That is, this animation involves deactivating all of the bars 612 in the bar plot view 610 and activating them sequentially one-by-one.

Activating a subsystem bar 612 activates, in the values list view 620 and in the parabox view 630, all constituent programs 114 and 124 within the selected subsystem 116 or 120, thus showing each in context. Thus, FIG. 7 shows an average subsystem 712, while FIG. 8 shows a subsystem 812 that is significant in view of the century change problem of the illustrative embodiment, in terms of its high values for the complexity metrics 622 and 624, the size 626 and the total number of affected lines 628. Advantageously, the invention provides a convenient technique to scan through a large number of subsystems to discover those that are significant. By watching the animation and manipulating the interface, an analyst can again discover, as shown in FIG. 8, that the "FINANC1" subsystem 136 of the "GENERALLEDGER" system 130 is complex, large, and highly impacted. In contrast, the analyst can determine, as shown in FIG. 7, that the "FINANCS" subsystem is neither highly complex nor contains a significant number of affected lines. It should also be appreciated that the selection device and the selection icon 180 can also be used to individually turn on and off each bar 612 of the bar plot 610. It should also be appreciated that animation can be used with any other selection mode.

Figure 9:
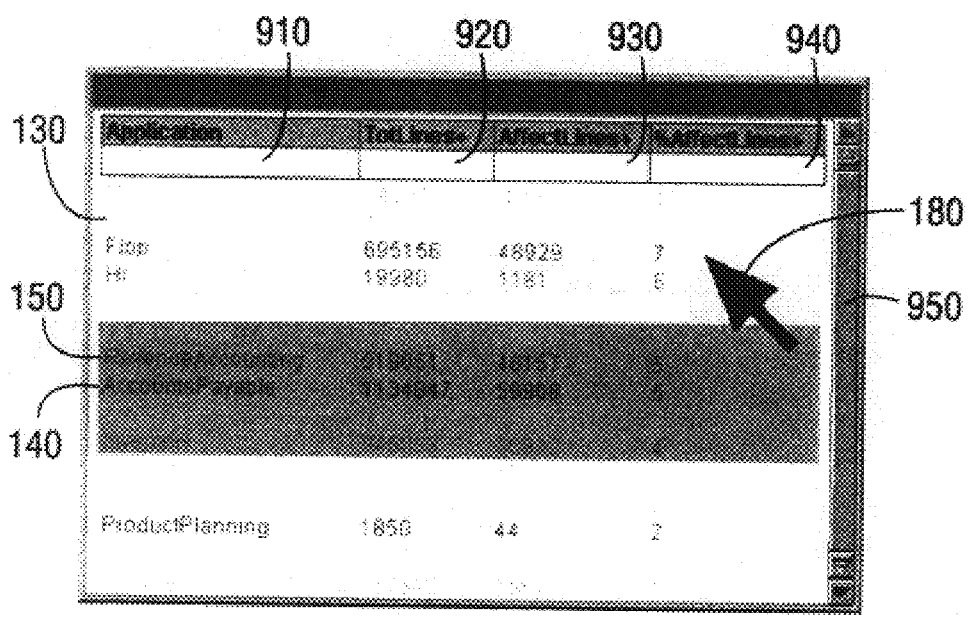
FIG. 9 is a values list of the systems shown in FIGS. 1 and 2 showing the system's colored and sorted according to the percent of characteristic-dependent lines.

FIG. 9 shows a values list view 900 corresponding to the systems shown in FIGS. 1 and 2. The values list view 900 shown in FIG. 9 displays the systems 910 color-coded as in FIG. 1, and the total lines 920 and the number of date-affected lines 930, with the systems 910 sorted in decreasing order according to the percentage of affected lines 940. As shown in FIG. 9, the "GENERALLEDGER" system 130, while not containing the highest percentage of affected lines 940, is significantly larger than the only system that contains a higher percentage of affected lines. Furthermore, the few other systems that are as complex as the GENERALLEDGER system 130, such as the REVENUEACCOUNTING and ACCOUNTSPAYABLE systems 140 and 100, have a lower percentage of the affected lines. Significantly, the list view 900 shown in FIG. 9 also confirms that the GENERALLEDGER system 130 is the single most-critical system of the exemplary legacy software application.

After using the application-wide views 100 and 200 shown in FIGS. 1 and 2, the system-level views shown in FIGS. 3–5, the application-wide linked view shown in FIG. 6, with or without animation as shown in FIGS. 7 and 8, and the list view shown in FIG. 9, to identify the few most-critical systems and subsystems of the legacy software application, the more detailed system-level and subsystem-level views shown in FIGS. 10–16 can be used to analyze these most-critical systems and subsystems and determine a conversion strategy and a tactical plan for implementing this strategy.

Figure 10:
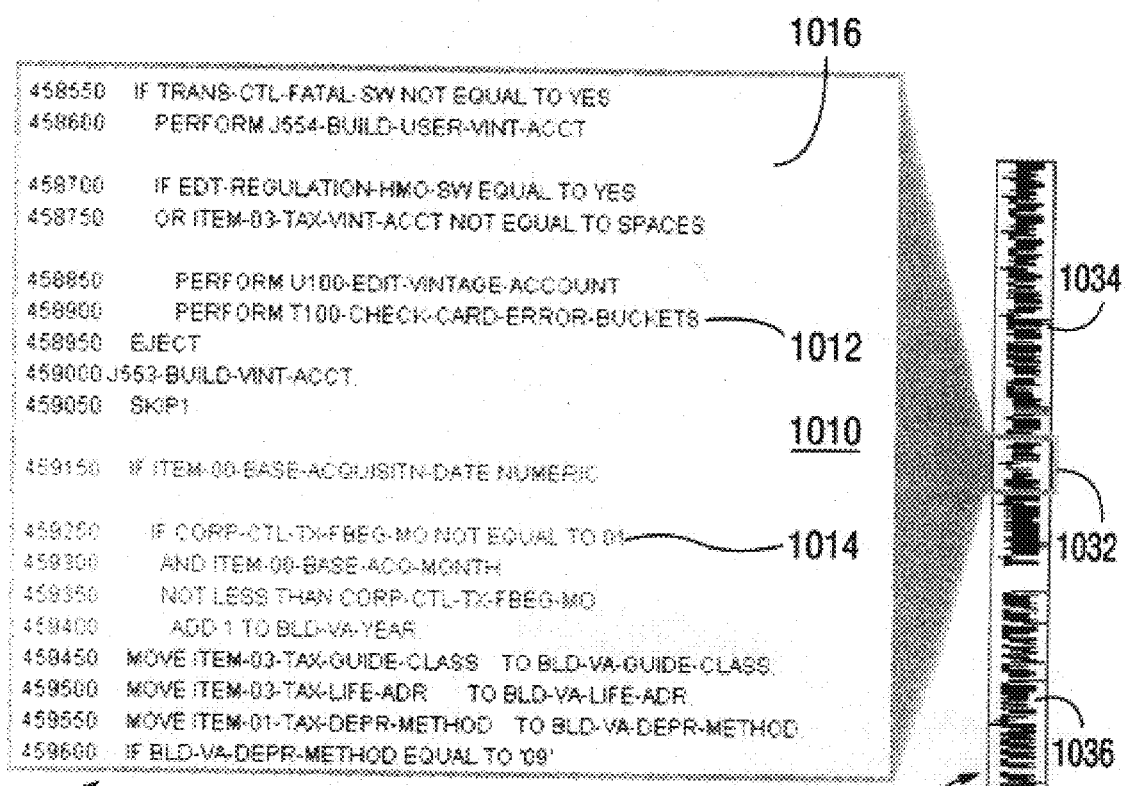
FIG. 10 shows the particular lines of code of a single program of the legacy software application displayed in a full-text view and a line view.

FIG. 10 shows a Seesoft™ view 1000, including two different views 1010 and 1030, of the actual source code of one of the programs, the F6X030 program, represented by the node 134B, of the FINANC1 subsystem 131 of the GENERALLEDGER system 130. The full-text view 1010 is the normal view presented in a text editing or viewing window, i.e., a browser window. The line view 1030 was generated using the Bell Labs Seesoft™ application, a software statistics visualization tool described in "Seesoft™—A Tool for Visualizing Line Oriented Software Statistics," S. G. Eick et al., IEEE Transactions on Software Engineering, Vol. 18, No. 11, pp. 967–968, November 1992, incorporated herein by reference in its entirety. Various aspects of Seesoft™ are described in more detail in U.S. Pat. No. 5,644,692 to Eick, U.S. patent application Ser. No. 07/802,912 to Eick, filed Jun. 12, 1991 (now pending as U.S. patent application Ser. No. 08/296,612, and now allowed), and U.S. patent application Ser. No. 08/317,081 to Atkins et al., each of which is incorporated herein by reference in its entirety.

The Seesoft™ line representation view 1030 shown in FIG. 10 can be displayed along with the full-text view 1010. In the full text view 1010, shown at the left hand side of FIG. 10, each of the various source code lines 1012–1016 of the displayed F6X030 program 134B is shown in a size that can be easily read. Furthermore, each of the lines of the source code of the F6X030 program 134B are color-encoded. Specifically, the blue-colored lines (e.g., line 1012) indicate those lines that are not affected by the century change, the red-colored lines (e.g., line 1014) indicate date-affected source code lines of the F6X030 program encoding data operations (DO). The yellow-colored lines (e.g., line 1016) indicate date-affected source code lines of the F6X030 program encoding data transfers (DX). Finally, although none are shown in FIG. 10, green-colored lines indicate date-affected source code lines of the F6X030 program that encode declarations (DC).

The rightmost portion of FIG. 10 shows the Seesoft™ line symbolic representation view 1030 disclosed in the above-incorporated applications. In the line symbolic representation view, or line view, 1030, each line or row of pixels 1034, i.e., each onepixel high row or line 1034, represents a single line (e.g., one of the lines 1012–1016) of the source code of the displayed program. In particular, the line view 1030 shown in FIG. 10 is shown using an indentation tracking view 1036.

This line view 1030 allows the source code lines of the entire program to be viewed at the same time. Thus, the various critical areas containing the affected data operations DO, the affected data transfers DX, and the affected declarations DC, as well as the unaffected portions of the program, can be instantaneously appreciated. As shown in the line representation view 1000 shown in FIG. 10, the lines shown on the full-text view 1010 are indicated by the box 1032 of the line view 1030.

One of the advantages of the Seesoft™ line view 1030 according to this invention, when shown using the indentation tracking view 1036, is that common programming techniques such as indentation to show loops and conditionals can be seen, thus giving an analyst an intuitive feel for the complexity of a particular program. In many programs using COBOL source code, sequence numbers are conventionally used at the beginning of each line, and remarks or comments are often inserted after the actual code, delimited by a semicolon.

As shown in FIG. 11, the Seesoft™ line view 1030 shown on the left hand side of FIG. 11, can further be reduced to the Seesoft™ pixel representation, or pixel view, 1040 shown on the right hand side of FIG. 11. The Seesoft™ pixel view 1040 is described in "Software Visualization in the Large", T. A. Ball et al., IEEE Computer, Vol. 29, No. 4, pp. 33–43, April 1996, herein incorporated by reference in its entirety. The Seesoft™ pixel view 1040 reduces each one-pixel high row 1034 representing a single line 1012–1016 of the source code down to a single pixel 1042. This allows a much larger number of lines to be simultaneously represented on the display, while still allowing the analyst to immediately see how the particular affected, or unaffected, lines of source code are clustered.

As shown in FIG. 12, to generate the Seesoft™ pixel view 1040 from the Seesoft™ line view 1030, each line 1034 of the Seesoft™ line view 1030 are mapped down to a single pixel 1042, and the pixels 1042 are sorted within each row 1044 of pixels of the Seesoft™ pixel view 1040 to group similar colors and thereby highlight color patterns. It should also be appreciated that, if there is sufficient resolution on the display, more than one pixel can be used to represent each line of code. In particular, the version of the pixel view 1040 shown in FIG. 12 is a pattern enhancing pixel view 1046.

Figure 16:
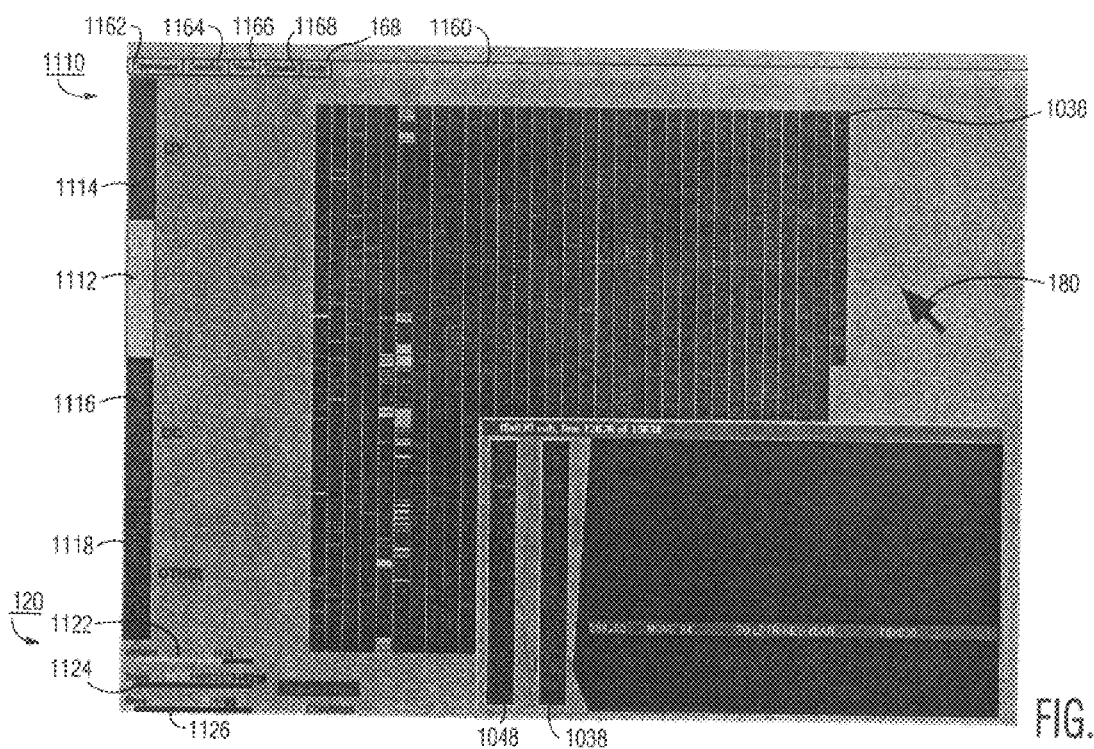
FIG. 16 shows the indentation tracking view of a software program and the corresponding sequence number view color-coded according to this invention.

One advantage of the pixel view 1040 according to this invention, when using the pattern enhancing pixel view 1046, is that patterns within the code can be more easily seen. The pixel view has another version, a line tracking view 1048, which is shown in FIG. 16. The line tracking view 1048 preserves the relative positions of the pixels in the pixel view 1040 as a function of the positions of the corresponding lines in the program. In the pattern enhancing pixel view 1046 of the pixel view 1040 shown in FIGS. 11 and 12, the relative positions of the lines are not preserved. Rather, similarly valued pixels are gathered together to enhance the analyst's ability to detect patterns in the programs, such as the patterns shown in FIG. 13. By being able to detect such patterns, the analyst can easily determine when two or more programs are related, such as the pairs of related programs shown in FIG. 13.

Thus, using the Seesoft™ line and pixel views 1030 and 1040 shown in FIGS. 10–12, once a critical system 110 or 120 or a critical subsystem 116 has been identified, an analyst may focus in on an important program of that critical system 110 or 120 or subsystem 116 and scale down to view the various source code lines of that important program. Furthermore, the various source code lines are color-coded to indicate whether or not they are affected by the application-wide repair or modification, and if they are affected, to indicate the various types of the affected source code lines.

Figure 13:
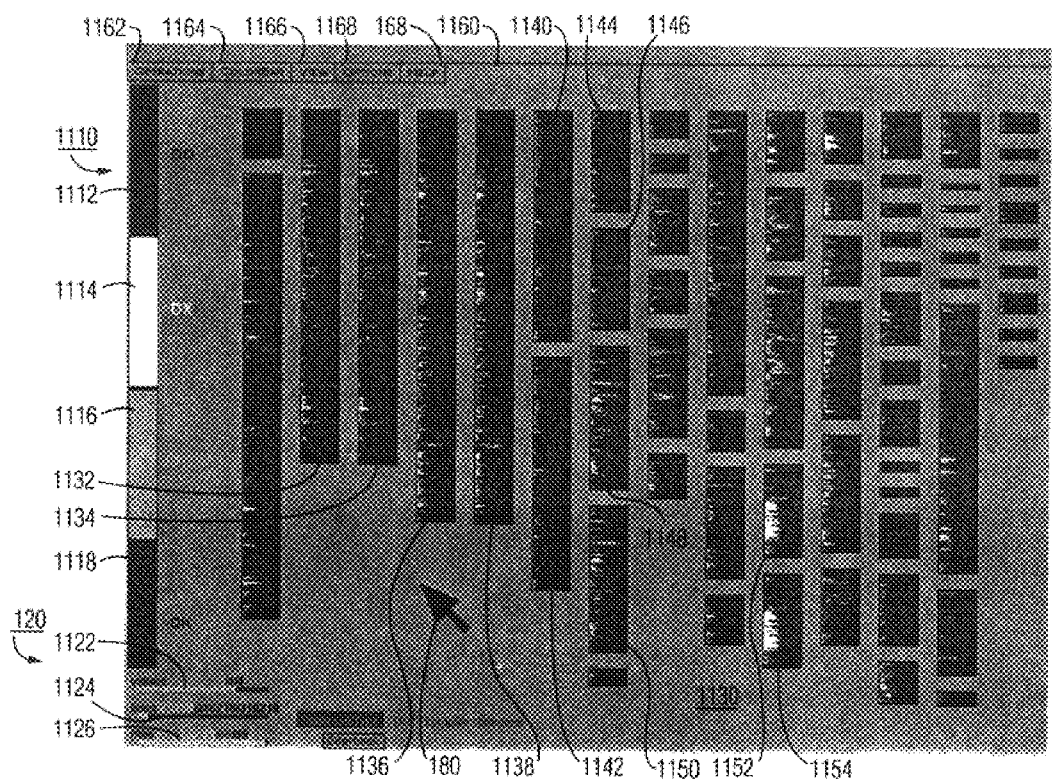
FIG. 13 is a display showing the various programs of a particular subsystem of the legacy software application using a block view color-coded according to this invention.

FIG. 13 shows the programs of the FINANC1 subsystem 131 in the pixel view 1100, using the Seesoft™ block view, where red pixels highlight the date-affected data operations DO, yellow pixels highlight the date-affected data transfer operations DX, green pixels highlight the date-affected declarations (DC), and blue pixels indicate the unaffected lines.

As shown in FIGS. 13–17, the colors for the various types of lines are selected using the selector bar 1110. In FIG. 13, the selector bar 1110 includes a data operation (DO) portion 1112, a data transfer (DX) portion 1114, a declaration (DC) portion 1116 and an unaffected (OK) portion, or an "OTHER" portion, 1118. Using the selection icon 180, the analyst can selectively turn on or turn off the display of the color-coding of the different types of lines by selecting or deselecting the corresponding portion 1112–1118. Additionally, the color-coding can be changed by selecting the corresponding portion 1112–1118 and then the COLORBAR menu 1164 of the menu bar 1160. It should also be appreciated that pop-up menus, in place or in addition to the drop-down menus shown in the figures, can also be used.

The menu bar 1160 includes an OPERATIONS menu 1162, the COLORBAR menu 1164, the VIEW menu 1166, the OPTIONS menu 1168 and the HELP menu 168. The OPERATIONS menu 1162 provides basic operational functions, for example, "open", "close" and "exit", as well as various display and select options, and an option to enable a conventional pop-up browser window. The COLORBAR menu 1164 provides operations that manipulate the selector bar 1110 and affect how the selector bar 1110 appears and functions. The VIEW menu 1166 provides functions that control the appearance of the files in the file display area 1130. The OPTIONS menu 1168 provides miscellaneous optional display functions.

In particular, the OPERATIONS menu 1164 contains entries for invoking one or more of the following actions: "Select/Unselect Files", "Selected Files As Lines", "Selected Files As Blocks", "Selected Files As Graphs", "New Browser", "Print" and "Exit". The Select/Unselect Files action allows the analyst to select and unselect individual files so the selected file's displayed representation can be changed. When this action is invoked, the cursor changes to a cross-hair in the main display area, and clicking and/or dragging the cursor over a file with the selection device will select and unselect the file. The Print action saves the data area in the well-known Postscript format, which can be printed by the analyst with a command line for printing Postscript files. The Exit action exits the Seesoft™ views.

Figure 14:
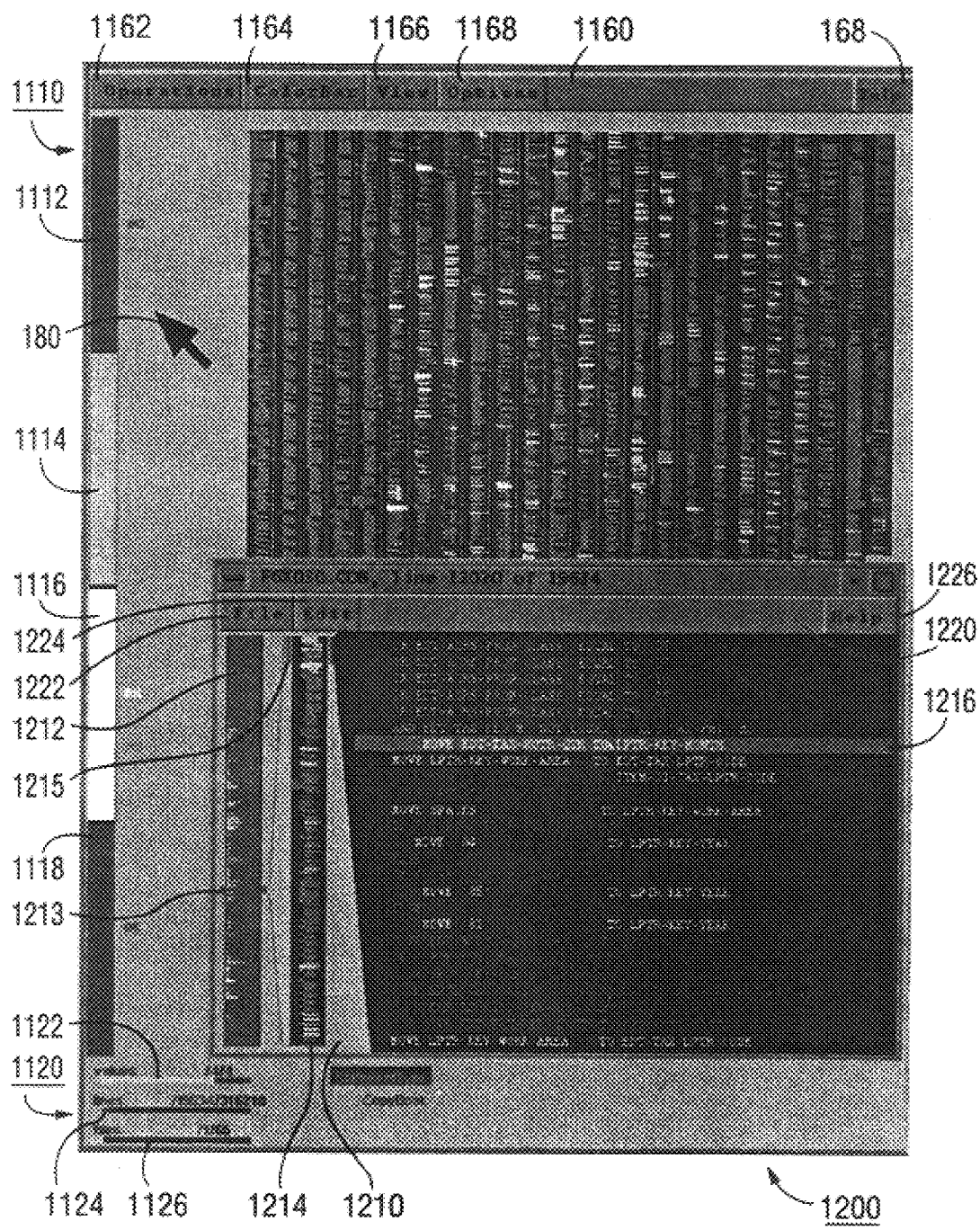
FIG. 14 is a display of a particular critical program of the legacy software application shown in line view and a browser window that includes the pixel view of the whole program, a line view of a portion of this program and a full representation of the source code of a portion of the line view color-coded according to this invention.

The Selected Files As Lines action changes the current view to the Seesoft™ line view 1030 shown in FIG. 14, where each line of the displayed file is represented by one line of pixels. The Selected Files As Blocks action changes the current view to the block view shown in FIG. 13, where the lines of the files are shown using the pixel view 1040. The block view uses variable size rectangles for each file, where the height of each rectangle is proportional to the size of the file. The Selected Files As Graphs action changes the current view to the graph view shown in FIG. 17. The graph view uses bar charts for each file, where each bar represents the differently color-coded lines in the file. Thus, the coloring shows the dominant statistical values in the file. The height of the graph containing the bar charts roughly corresponds to the size of the file.

The New Browser action opens a new pop-up browser window for viewing the actual full-text view 1010 of the code of the selected file. The browser window displays the text of the lines represented by the pixel rows currently selected by the cursor as the cursor is moved. As shown in FIG. 14, the file name and line number of the current file and line being displayed are shown in the title bar of the browser window. The browser window also shows the pixel view of the current file for an overview of how the statistical values are distributed within the current file, and a portion of the line view representation of the file, generally centered on the current line. These representations and the main text display indicate the region being viewed with a "magnifying" glass shown as vertical bars. This "magnifying glass can be moved with the selection device in either the browser window or the main view.

The VIEW menu 1166 contains entries for invoking one or more of the following actions: "Files As Lines", "Files As Blocks", "Files As Graphs", "Show All Files", "Show Selected Files", "Unselect All Files" and "Hide All Files". The Files As Lines action changes the current view to the Seesoft™ line view 1030., where each line of the displayed file is represented by one line of pixels. The Files As Blocks action changes the current view to the block view shown in FIG. 13, where the lines of the files are shown using the pixel view 1040. The block view uses variable size rectangles for each file, where the height of each rectangle is proportional to the size of the file. The Files As Graphs action changes the current view to the graph view shown in FIG. 17. The graph view uses bar charts for each file, where each bar represents the differently color-coded lines in the file. Thus, the coloring shows the dominant statistical values in the file. The height of the graph containing the bar charts roughly corresponds to the size of the file. The Show All Files action displays all files of the current application, system or subsystem using the selected line, pixel or graph view, and makes visible all hidden files. The Show Selected Files action displays the selected files of the current application, system or subsystem using the selected line, pixel or graph view, and makes visible any selected files that are also hidden. The Unselect All Files unselects all previously selected files.

The Hide All Files action itself has a number of submenu actions, including: "Hide Inactive Files", "Hide Selected Files", "Hide Unselected Files" and "Hide All Files". The Hide Inactive Files action hides any files in the current view that do not have any active statistical values. As a result, only the file labels of these files remain visible. The Hide Selected Files action hides any selected files in the current view, with only the file labels for these files remaining visible. The Hide Unselected Files action hides any unselected files in the current view, with only the file labels for these files remaining visible. The Hide All Files hides all files in the current view, with only the file labels for the hidden files remaining visible.

The OPTIONS menu 1168 contains entries for invoking one or more of the following actions: "Indentation", "Activate Current Line Color", "Stack Columns Vertical" and "Display File Labels". The Indentation action allows the analyst to specify whether files will be displayed in the indentation tracking view or the sequence number view. The default is the indentation tracking view. The Activate Current Line Color action allows the analyst to specify whether cursor movement over files will activate the color of the current line. The default is to disable or turn off this feature. The Stack Columns Vertical action allows the analyst to stack files vertically to conserve screen space. The default is to enable or turn on this feature. The Display File Labels action allows the analyst to specify whether the file labels are to be displayed. The default is that the file labels are displayed.

The window 1120 also includes a values bar 1122; a lines bar 1124 and a files bar 1126. As shown in FIGS. 13–17, each of these bars have three values associated them. These values represent the number of displayed and active items, the number of displayed active and inactive items, and the number of displayed, inactive and hidden items, respectively. Of course, if additional attributes, beyond active, inactive and hidden, are provided, additional values for such additional attributes would be associated with these bars. Thus, the values bar 1122 indicates the number of values that are active in the colorbar, the number of values that are active and inactive, and the number of active, inactive and hidden values, respectively. Similarly, the lines bar 1124 indicates the number of lines that are active, as a function of the active values in the colorbar, the number of lines that are active and inactive, as a function of the active and inactive values in the colorbar, and the number of active, inactive and hidden lines, as a function of the active, inactive and hidden values in the colorbar, respectively. Likewise, the files bar indicates the number of displayed files that have active lines, the number of displayed files that have active and inactive lines, and the number of displayed (active or inactive) and hidden files, respectively.

Thus, FIG. 13 shows the sixty-five block symbolic representation vies 1130 of the sixty-five programs that form the FINANC1 subsystem 131. In particular, these sixty-five program block symbolic representation views 1130 represent over 316,000 line of COBOL source code. Of these, over 23,000 (7.4%) lines are identified as being date-dependent (i.e., are active), a significantly high percentage. The statistics associated with the lines bar 1124 reveal this because the "OK" lines were made inactive by clicking the "OK" lines portion 1118 of the selector bar 1110 to deselect the "OK" lines portion 1118 and thus make the OK lines portion 1118 and the OK lines inactive.

Furthermore, as shown in FIG. 13, using the pixel view 1100 allows programs having strongly similar code patterns to be quickly identified. By recognizing similar code patterns, analysts can save time in the conversion process and eliminate duplicative work. Thus, by comparing program representations using the pixel 1100 view shown in FIG. 13, related sets of similar files can be easily identified. In particular, the files are represented by the second and third columns 1132 and 1134 appear to have a high degree of similarity, as do the programs represented by the fourth and fifth columns 1136 and 1138. Similarly, the two files 1140 and 1142 forming the sixth column appear to have a high degree of similarity, as do the two files 1144 and 1146 forming the top of the seventh column, and the two files 1148 and 1150 forming the bottom of the seventh column. Similarly, the two files 1152 and 1154 forming the bottom of the tenth column appear to have a high degree of similarity.

These pairs of files having high degrees of similarity were likely created using a "cut-and-paste" programming style that can be verified using the fall-text view 1010 and the line view 1030 of the Seesoft™ view 1000, which can be pulled up into a browser window 1210, as shown in FIG. 14. That is, using the line view 1030, an analyst can confirm that similar files actually have the same relative structure of types of affected lines. Assuming the line view 1030 confirms the similar files do have the same structure, the analyst can confirm the files were created using the "cut-and-paste" programming style by examining the files in detail using the full-text view 1010.

In particular, similar repair strategies should be used for related sets of files. Furthermore, the large number of related files of the FINANC1 subsystem 131 indicate maintenance problems with this subsystem and code churn that has been repaired using stop-gap measures. Such maintenance problems and code churn suggest that at least this subsystem may be a candidate for replacement rather than conversion.

In adapting the Seesoft™ line view 1030 for use with COBOL source code, the Seesoft™ line view 1030 was modified so that the line view 1030 can be toggled between a sequence number view 1038, shown in FIG. 16, and the indentation tracking view 1036. The sequence number view 1038 captures the sequence numbers and remarks, and thus makes the color coding and color patterns more visible. In contrast, the indentation tracking view 1036 shown in FIG. 10 color codes only the actual source code portion of the lines, excluding the sequence numbers and any trailing remarks. The identification tracking view 1036 thus also supplies the indentation information.

FIG. 14 shows the Seesoft™ line view 1030 using the indentation tracking view of one of the critical programs, the F6X030 program (represented by node 134B) of the FINANC1 subsystem 131. In particular, the F6X030 program contains over 19,000 lines, of which over 1,500 are affected. Of the total affected lines, approximately six hundred eighty lines encode data operations (DO), approximately six hundred thirty lines encode data transfers (DX), and approximately two hundred thirty lines encode data declarations (DC). As shown in FIG. 14, a browser window 1210 can be opened to view in greater detail particular ones of the source code lines 1012–1018 of the F6X030 program represented by the node 134B. As shown in the browser window 1210 of FIG. 14, a Seesoft™ pixel view 1212 of the entire F6X030 program is shown in the left hand portion, a Seesoft™ line view of a portion of the F6X030 program is shown in the middle portion, with the displayed portion shown in the line view 1214 indicated adjacent the pixel view 1212 by the lines 1213. Furthermore, the right hand portion of the browser window 1210 of FIG. 14 shows a full resolution view 1216 of a smaller portion of the actual source code. The location of this portion of the source code in the line view 1214 is indicated by the colored bars 1215 adjacent to the portion of the line view 1214.

The browser window 1210 also includes a menu bar 1220. The menu bar 1220 includes a File menu 1222, an EDIT menu 1224 and the HELP menu 1226. These menus operate in the conventional manner of windowing operating systems.

Figure 15:
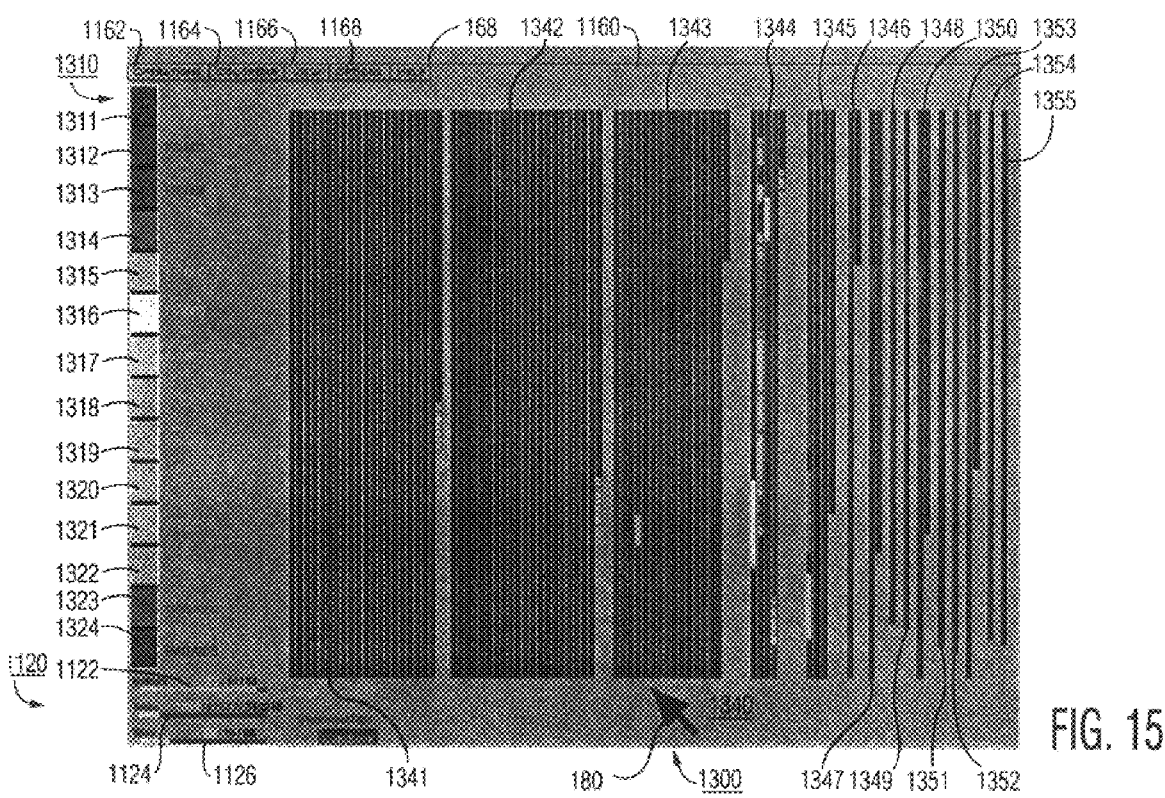
FIG. 15 shows a number of different programs of the legacy software application with the various copybooks used in these programs color-coded according to this invention.

FIG. 15 shows a copybook view 1300, which shows copybook lines color-coded according to the particular copybook name. In conventional COBOL programs, copybooks are mechanisms that are similar to "include" statements of the well-known C programming language for inserting repeated code fragments. Copybooks are used for code segments that are common to many programs. Since copybook code is replicated, it needs to be repaired only once. Thus, by analyzing copybooks, the repair effort can be better estimated. As shown in FIG. 15, one of the visualization tools of this invention locates and displays copybooks present in the legacy software application. In particular, FIG. 15 shows the lines of the fifteen programs of the FINANC1 subsystem 131 that contain copybooks. Using the interactive filters of the software visualization tools of this invention, the copybooks of the FINANC1 subsystem 131 are identified and displayed.

The copybook view 1300 includes a copybook bar 1310, the graph portion 1120, and a copybook display portion 1340. The copybook bar 1310 is merely a particular form of the colorbar 1110, but which now encodes the copybook names rather than the unaffected lines and the type of statement for affected lines. The copybook bar 1310 includes copybook portion 1311 for the non-copybook lines and copybook portions 1312–1324 for each of the thirteen copybooks of this subsystem. Each copybook portion 1311–1324 can be selected and deselected to turn on and off the display of the corresponding copybook code lines in the copybook display portion 1340. The copybook display portion displays line symbolic representations 1341–1355 of the fifteen programs of this subsystem that include one or more of the copybooks color-coded according to the colors of the corresponding copybook portions 1311–1324 of the copybook bar 1310.

Typically, COBOL programs contain large numbers of copybooks. Thus, the analyst would be surprised upon discovering only approximately thirteen hundred lines of this subsystem are from copybooks. This is a significantly small number. Moreover, these thirteen hundred lines organize into only thirteen different copybooks present in only fifteen different programs of the FINANC1 subsystem 131. Furthermore, of these approximately thirteen hundred lines, just one hundred fifty lines are date-dependent. Expectedly, none of these one hundred fifty affected lines involve data operation (DO) statements, as copybooks frequently involve no executable statements. This can be seen by deactivating the non-copybook lines by deselecting the non-copybook portion 1311 of the copybook bar 1310 in the copybook view 1300 and by deactivating the OK lines by deselecting the OK portion 1118 in the colorbar 1110 in the pixel view 1100.

The individual copybooks can be more easily seen by deactivating the individual copybook portions 1311–1324 and sequentially activating them using the selection device and selection icon 180 to select the different copybook selection portions 1311–1324 shown in the left hand portion of FIG. 14. By individually activating each copybook portion 1311–1324, it becomes apparent which copybooks are used in which different files. Furthermore, in the full view shown in FIG. 15, it initially appeared that the interesting pattern of blue copybooks shown in the ten right-most files was due to the same copybook being repeatedly included. Closer examination using the individual copybook view however, reveals that there are actually two copybooks, encoded by two slightly different blue colored portions 1323 and 1324. One of these copybooks, represented by the copybook portion 1323, is included in the right-most ten files, while the other copybook, represented by the copybook portion 1324, is included in only three of these files. Subtle insights such as these are easily overlooked in static views, but, in accordance with the invention, are readily apparent when manipulating the copybook bar 1310 interactively, for example, by using an animation over the values of the copybook bar 1310.

Thus, as shown in FIGS. 13–17, an analyst can quickly move from the application-wide views 100 and 200 and the system-level views 300–400 to view the particular programs of a system 110 or 120 or a subsystem, and the particular source code of a significant program, to view how an application-wide conversion will affect the particular lines of one or more programs of the application.

FIG. 16 shows a second version of the Seesoft™ line view 1030 of one of the critical programs, the F6X030 program of the FINANC1 subsystem 131, that was shown in FIG. 14. As shown in FIG. 16, the colors assigned to the various values assigned to the colorbar can be changed. This is immediately reflected in the line view 1030, where the colors that the lines of the line view 1030 are shown in are converted to the colors assigned to the corresponding values of the colorbar. FIG. 16 also shows the lines of the line view 1030 using the sequence number line view 1038, which preserves the sequence numbers and the comments. This allows the color coding of the various lines to be more easily viewed. Finally, in the browser window shown in FIG. 16, the position tracking pixel view 1048 version of the pixel view 1040 is used.

Figure 17:
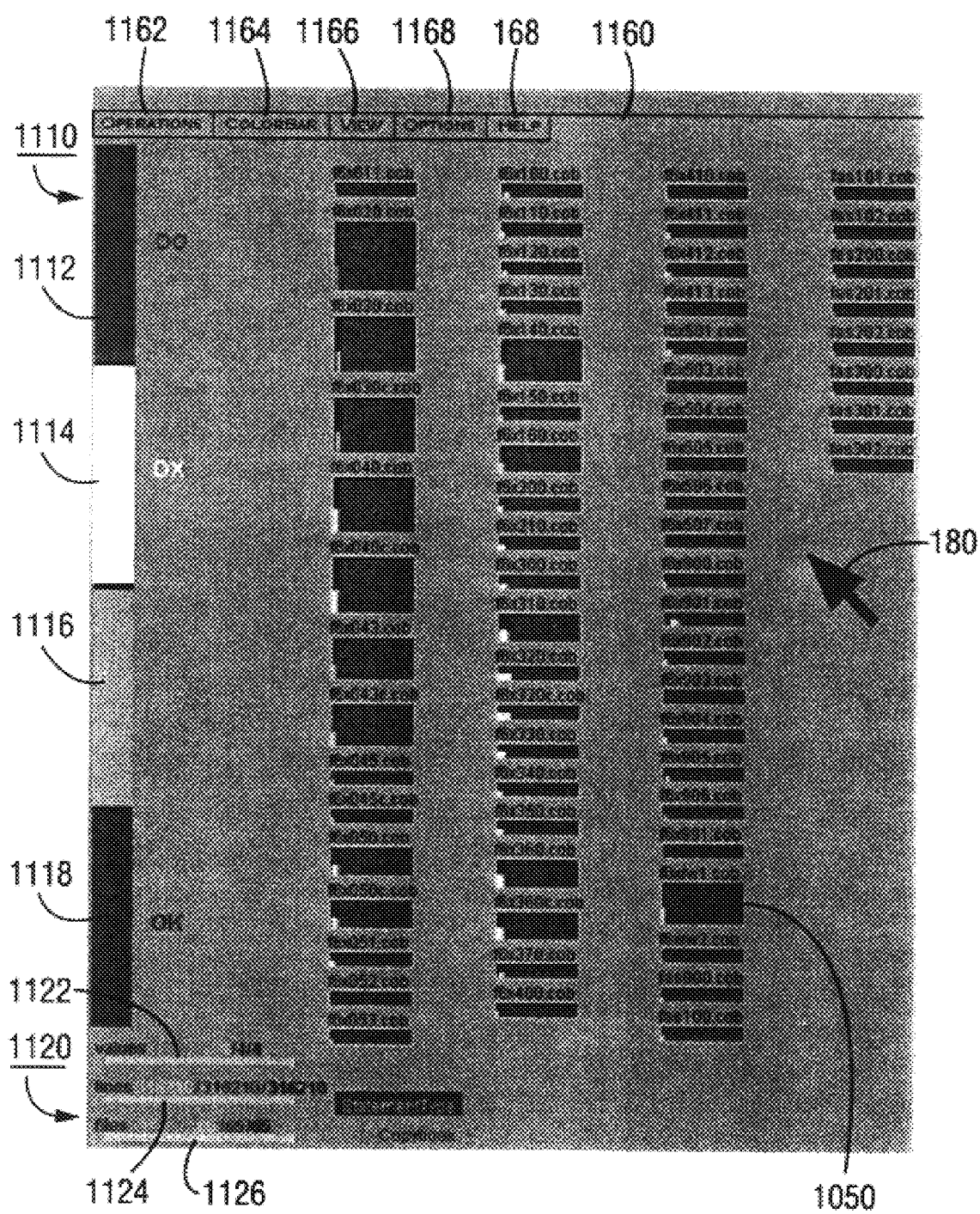
FIG. 17 is a display showing the various programs of the particular subsystem using a graph view color-coded according to this invention.

FIG. 17 shows yet another Seesoft™ representation, a graph view 1050 which represents the programs using a bar chart representation. One significant advantage of both the pixel view 1040 and the graph view 1050 is that they are more compact and scaleable than the line view 1030. High-resolution monitors frequently display more than 1 million pixels on, for example, a 1280-by-1040 resolution monitor. These views makes it possible to see patterns in extremely large portfolios of code on a single screen, as shown in FIG. 13, that displays over 300,000 lines of code using the pixel view 1040 of FIG. 11.

Figure 18:
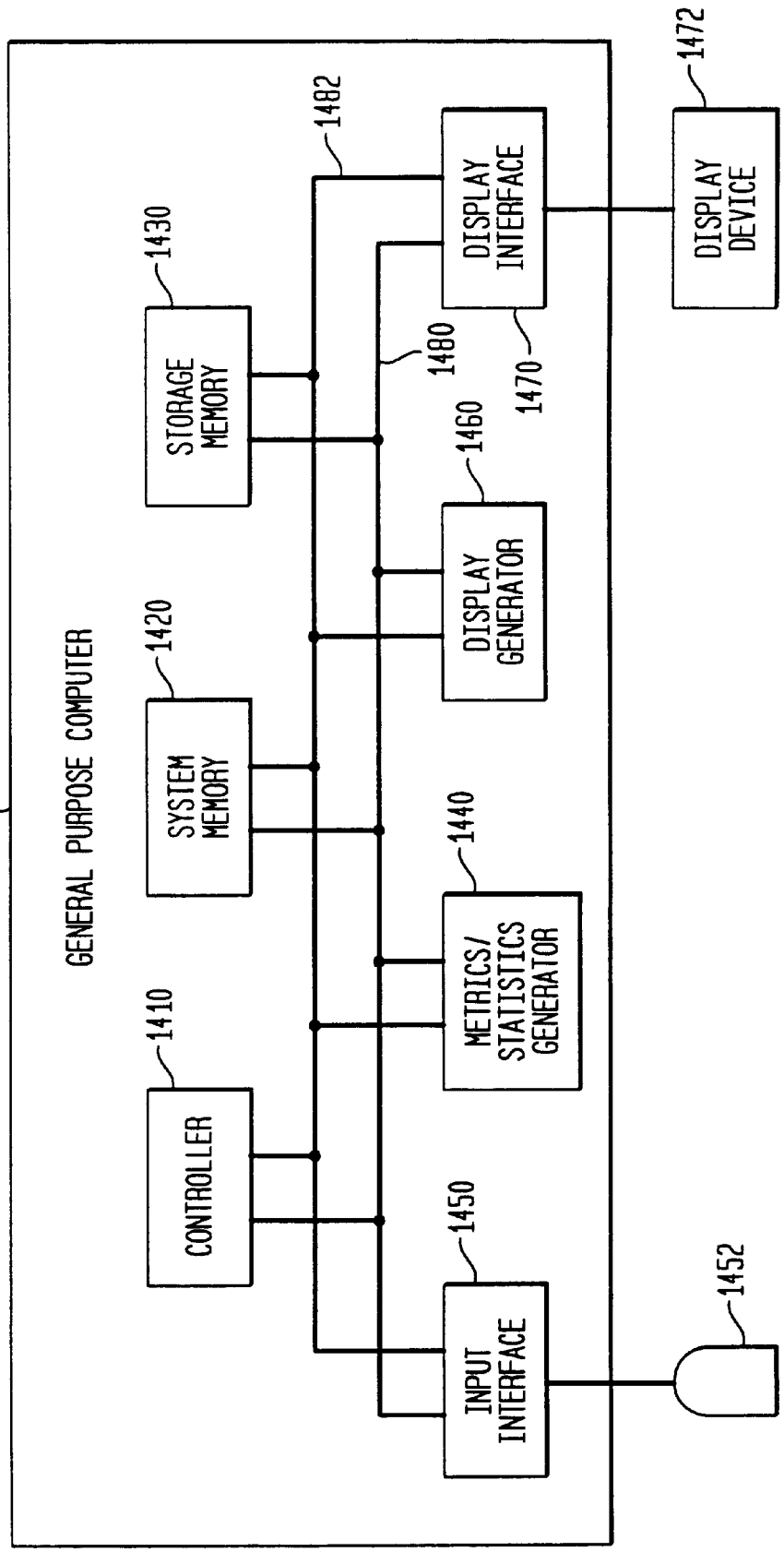
FIG. 18 is a block diagram of one preferred embodiment of an apparatus for generating and displaying the views of this invention.

FIG. 18 shows a block diagram of a software analysis apparatus for generating and displaying the views 100–1300 of this invention. As shown in FIG. 18, the software analysis apparatus is preferably implemented using a programmed general purpose computer 1400. The programmed general purpose computer is preferably programmed to generate the various metrics and statistics described above from the software portfolio or application being analyzed. In particular, the general purpose computer preferably executes the various software programs outlined above, including the Seesoft™ software package and the commercially available software parsing tools, such as COBOL Analyst 2000™.

As shown in FIG. 18, the general purpose computer 1400 includes a controller 1410, a system memory 1420, a storage memory 1430, a metric/statistics data generator 1140, an input interface 1450, a selector 1452, a display generator 1460, a display interface 1470 and a display device 1472, interconnected by a data bus 1480 and a control bus 1482.

The system memory 1420 can be any alterable random access memory, including static RAM, dynamic RAM or flash memory. The system memory 1420 is used to store system variables and data being used by one or more of the programs executed by the controller 1410. For example, the system memory will store the display data for any of the views 100–1300 currently being displayed on the display 1472. Thus, the system memory will generally be allocated into a number of portions, such as a display data portion, a source code portion for accessing the source code of a program displayed in a browser window, one or more program portions, and the like. The storage memory 1430 can be any non-volatile memory, such as a floppy disk and disk drive, a writable optical disk and disk drive, a hard drive, flash memory or the like.

The storage memory 1430 stores any data not presently being used by any of the programs executed by the controller 1410, such as the source code of the programs forming the software application or portfolio being analyzed and the data for any metric and/or statistic being used by the analyst in analyzing the software portfolio or application. Thus, the storage memory will be allocated into a number of portions, such as a software portfolio/application portion that stores the software application or portfolio being analyzed, a metric/statistic data portion that stores the obtained metric and statistical values, and the like. It will be appreciated that the system memory 1420 and the storage memory 1430 can be the same memory.

The metric/statistics data generator 1440 is preferably one or more software programs executable on the controller 1410 and generates the metric and statistical values desired by the analyst, if this data is not already available and stored in the storage memory, for the software portfolio or application being analyzed. The display generator 1460 is preferably one or more software programs executable on the controller 1410 and generates the various views 100–1300 from the metric and statistical data stored in the memories 1420 and/or 1430 and the source code for one or more applications, systems, subsystems and/or programs stored in the memories 1420 and/or 1430.

The input interface 1450 connects the selector 1452 to the general purpose computer 1400. In general, the selector 1452 can be any device capable of moving the selection icon 180, such as a mouse, a trackball, a touch pad, a keyboard, a pen-based device or the like. The input interface 1450 can also be used to connect two or more of these devices to the general purpose computer 1400, such as a mouse and a keyboard. Accordingly, the input interface can be one physical device or two or more separate devices.

The display interface 1470 connects the display device 1472 to the general purpose computer 1400 and can be any known device, such as a video card or the like. The display interface 1470 typically contains its own memory, and is used to generate and supply the display drive signals to the display device from the display signals generated by the display generator.

In operation, the analyst, in accordance with this invention, after selecting the software application or portfolio to analyze, will determine if the selected software application has already been analyzed to obtain data for the desired metrics and statistics. If the selected software application has already been analyzed, and the resulting data has been stored to memory, the analyst can immediately begin interactively using the views 100–1300 in accordance with the various aspects of this invention. Otherwise, if the selected software application has not been analyzed to obtain the data for the metrics and/or statistics the analyst wishes to have displayed in the views 100–1300, the analyst will apply the various known software analyzing tools, such as those described above, to obtain the data for the desired metrics and/or statistics.

The analyst then interactively displays the data for various ones of the desired metrics and/or statistics using one or more of the views 100–1300. Because the views 100–1000 of this invention are interactive, and the selected metrics and/or statistics can be interactively changed within a view, there is no fixed path through the various views 100–1300 of this invention. Rather, the analyst will switch between various ones of these views, will change the selected metrics and/or statistics, and will change how the selected metrics and/or statistics are displayed until the analyst has analyzed the obtained data for the desired metrics and/or statistics until the analyst has reached the desired and/or necessary conclusions concerning the software application or portfolio being analyzed. These conclusions can include, without limitation: 1) determining the order in which the applications of a portfolio will be selected for conversion; 2) determining the order in which the systems and subsystems of an application will be selected for conversion; 3) determining which systems, subsystems and/or programs can be modified, which must be replaced, and which can be provided with translation code, such as a windowing scheme; 4) which applications, systems, subsystems and programs will require the largest amount of resources to convert; and 5) which applications, systems, subsystems and/or programs will be the most or least complicated to convert.

FIGS. 19A–22 show one embodiment of the method for visually analyzing an existing software structure, such as a software application or a portfolio of software applications, to assess and strategically plan the implementation of a structure-wide change to the software structure, such as that required to repair legacy software in view of the century change problem.

Figure 19A:
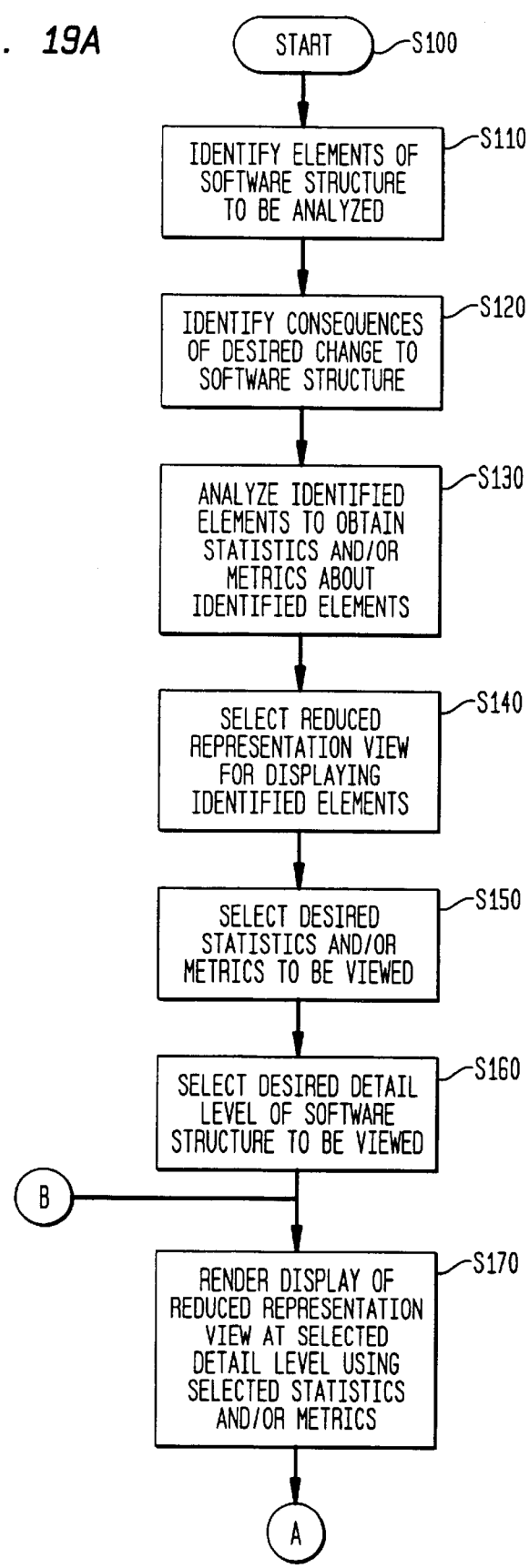
FIGS. 19A and 19B are a flowchart outlining one embodiment of a method of analyzing a software structure according to this invention.
Figure 19B:
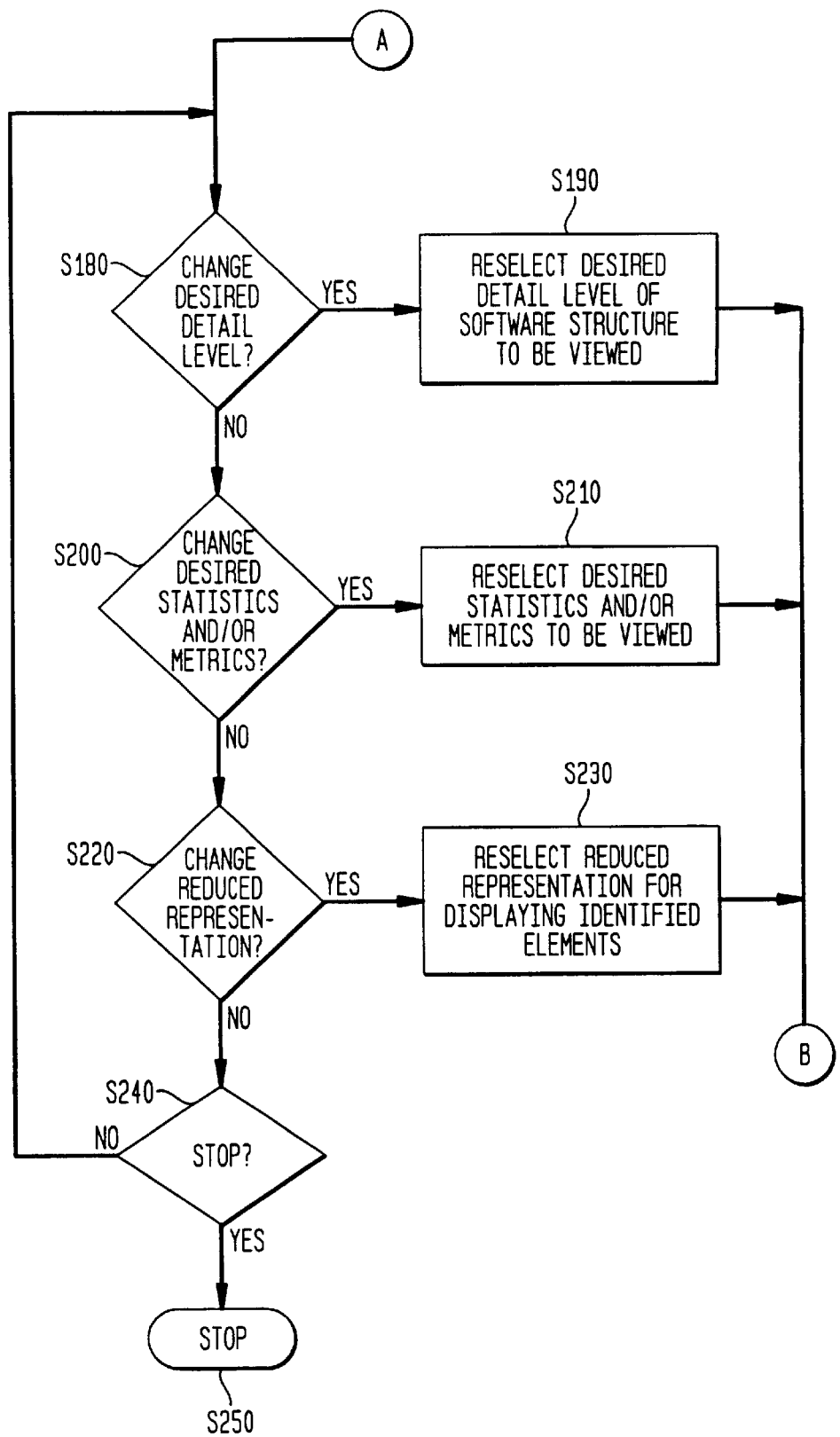

In particular, FIG. 19A outlines one embodiment for obtaining and displaying data about the software structure necessary to perform these tasks. Thus, starting in step S100, the control routine outline in FIGS. 19A and 19B continues to step S110, where the elements of the software structure to be analyzed are identified. For example, according to this invention, depending on the change to be implemented and the structure being analyzed, the identified elements could be a system and its constituent subsystems and/or programs, an application comprising a number of such systems, or a portfolio containing a number of such applications.

Then, in step S120, the consequences of the desired change to the software structure are identified. For example, in the exemplary legacy software application described herein, the particular programming consequence to be identified is whether or not each particular line of the program is date-dependent. In addition, for each such date-dependent line, a further programming consequence is identifying the type of statement that that line encodes.

Next, in step S130, the identified elements of the software structure are analyzed to obtain one or more statistics and/or one or more metrics about the identified elements. Such statistics and metrics are outlined in detail below. The control routine then continues to step S140, where the analyst selects a symbolic representation view for displaying the identified elements. Then, in step S150, the analyst selects the desired statistics and/or metrics to be viewed. That is, the analyst selects the desired statistics and/or metrics that will be used to control how the symbolic representation view is rendered. In particular, the selected statistics and/or metrics are used to control the appearance of the symbolic representation of the displayed elements, including color and shape. In step S160, the analyst selects the desired detail level of the software structure to be viewed. The control routine then continues to step S170.

In step S170, the control routine renders a display of the identified elements of the software structure using the selected symbolic representation view to display the elements of the software structure at the selected detail level. The display of the selected symbolic representation view is rendered using the selected statistics and/or metrics to control the appearance of the particular symbolic representations of the particular elements of the software structure appearing at the selected detail level. Then, in step S180, the control routine determines whether the analyst wishes to change the desired detail level. If so, control continues to step S190. Otherwise control jumps to step S200. In the step S190, the control routine allows the user to reselect the desired detail level of a software structure to be viewed. Control then jumps back to step S170 and the display is rerendered.

In step S200, the control routine determines whether the analyst wishes to change the desired statistics and/or metrics use to render the display. If so, control continues to step S210. Otherwise, control jumps to S220. In step S210, the control routine allows the analyst to reselect the desired statistics and/or metrics to be viewed. In particular, because many of the views described below display a number of different statistics and/or metrics in step S210, the control routine allows the user to change one or more of the desired statistics and/or metrics. Control then again returns to step S170.

In step S220, the control routine determines whether the analyst wishes to change the desired symbolic representation view. If so, control continues to step S230. Otherwise, control jumps to step S240. In step S230, the control routine allows the analyst to reselect the desired symbolic representation view for displaying the identified elements of the software structure. Control then again jumps back to step S170 to rerender the display.

In step S240, the control routine determines whether the analyst wishes to end the software visualization process. If not, control jumps back to step S180, thus allowing the analyst to make further changes to the selected symbolic representation view, further changes to the selected detail level, and/or further changes to the selected statistics and/or metrics. Otherwise, control continues to step S250, where the software visualization process ends.

Figure 20:
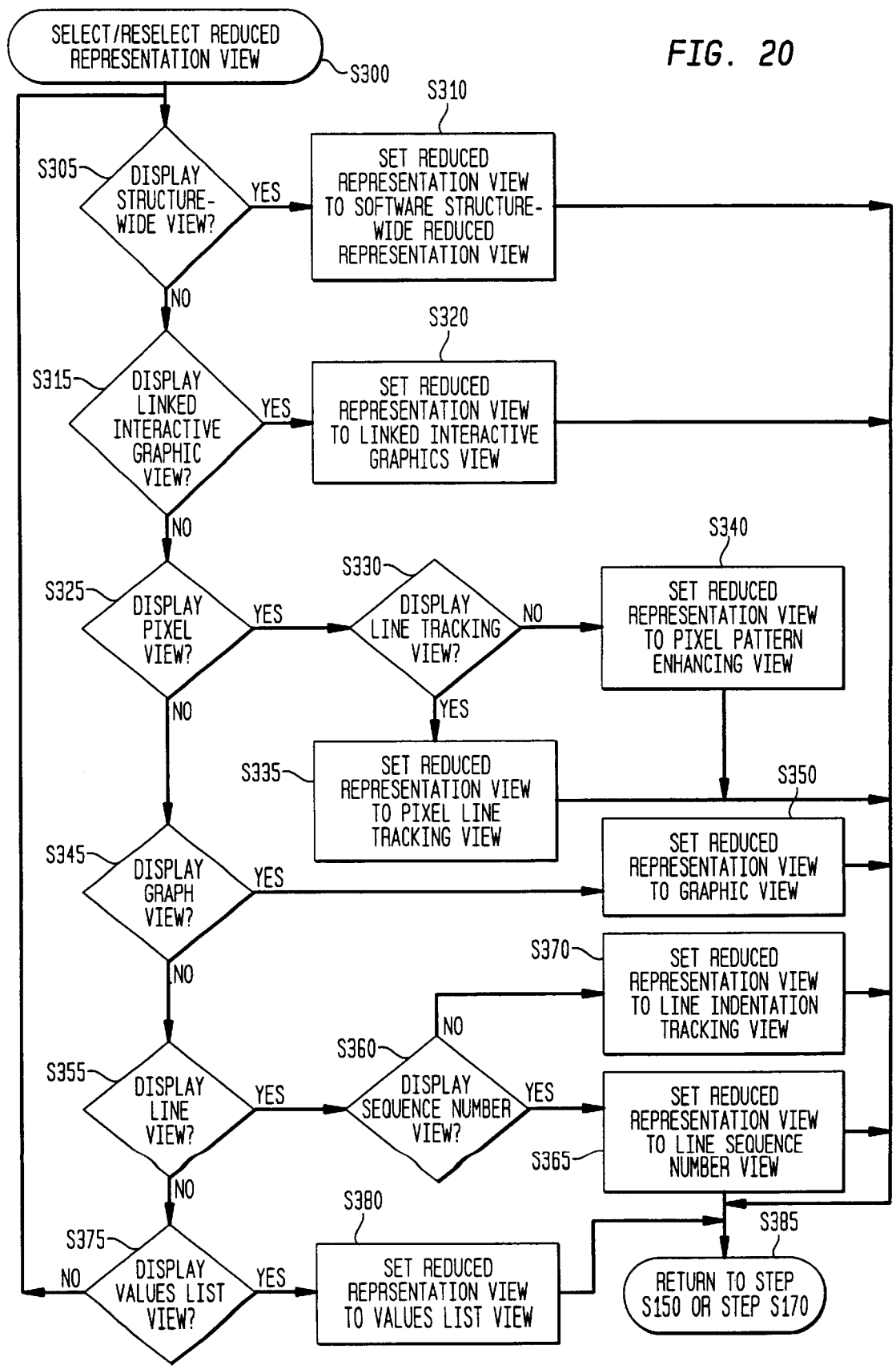
FIG. 20 is a flow chart outlining one embodiment of the steps of selecting and reselecting the desired symbolic representation view of FIGS. 19A and 19B according to this invention.

FIG. 20 shows the process for selecting or reselecting the desired symbolic representation view of steps S140 and S230 in greater detail. In particular, beginning in step S300, the control routine continues to step S305, where the control routine determines whether the analyst wishes to display the structure-wide view. If so, control continues to step S310. Otherwise, control jumps to step S315. In step, S310, the control routine sets the symbolic representation view to the software structure-wide symbolic representation view. Control then jumps to step S385.

In step S315, the control routine determines whether the analyst wishes to display the linked interactive graphic view. If so, control continues to step S320. Otherwise, control jumps to step S325. In step S320, the control routine sets the symbolic representation view to the linked interactive graphics view. Control then again jumps to step S385.

In step S325, the control routine determines whether the analyst wishes to display the pixel view. If so, control continues to step S330. Otherwise, controls jumps to step S345. In step S330, the control routine determines whether the analyst wishes to display the pixel view using the line tracking pixel view. If so, the control routine continues to step S335. Otherwise, the control routine jumps to step S340. In step S335, the control routine sets the symbolic representation view to the line tracking pixel view. In contrast, in step S340, the control routine sets the symbolic representation view to the pattern enhancing pixel view. From both steps S335 and S340, the control routine jumps to step S385.

In step S345, the control routine determines whether the analyst wishes to display the graph view. If so, control continues to step S350. Otherwise, control jumps to step S355. In step S350, the control routine sets the symbolic representation view to the graph view. Control then jumps to step S385.

In step S355, the control routine determines whether the analyst wishes to display the line view. If so, control continues to step S360. Otherwise, control jumps to step S375. In step S360, the control routine determines whether the analyst wishes to display the line view using the sequence number line view. If so, control continues to step S365. Otherwise, control jumps to step S370. In step S365, the control routine sets the symbolic representation view to the sequence number line view. In contrast, in step S370, the control routine sets the symbolic representation view to the indentation tracking line view. From both steps S365 and S370, control jumps to step S385.

In step S375, the control routine determines whether the analyst wishes to display the values list view. If so, control continues to step S380. Otherwise, control returns to step S305. In step S380, the control routine sets the symbolic representation view to the values list view. Control then continues to step S385. In step S385, control returns to step S150 or step S170, depending on whether the symbolic representation view selection/reselection process 300 was entered via step S140 or step S230, respectively.

Figure 21A:
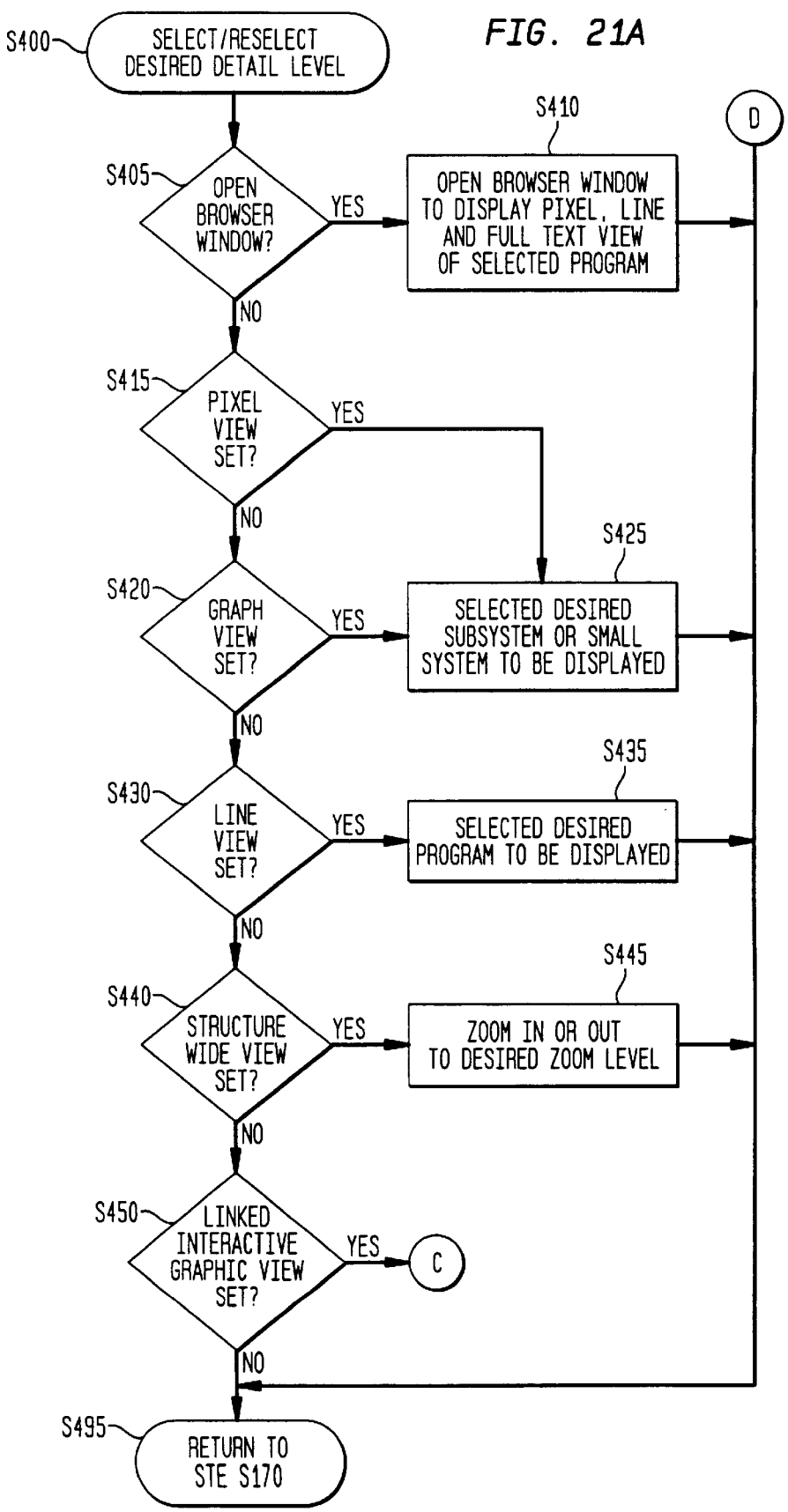
FIGS. 21A and 21B are a flowchart outlining one embodiment of the steps of selecting and reselecting the desired detail level of FIGS. 19A and 19B according to this invention.
Figure 21B:
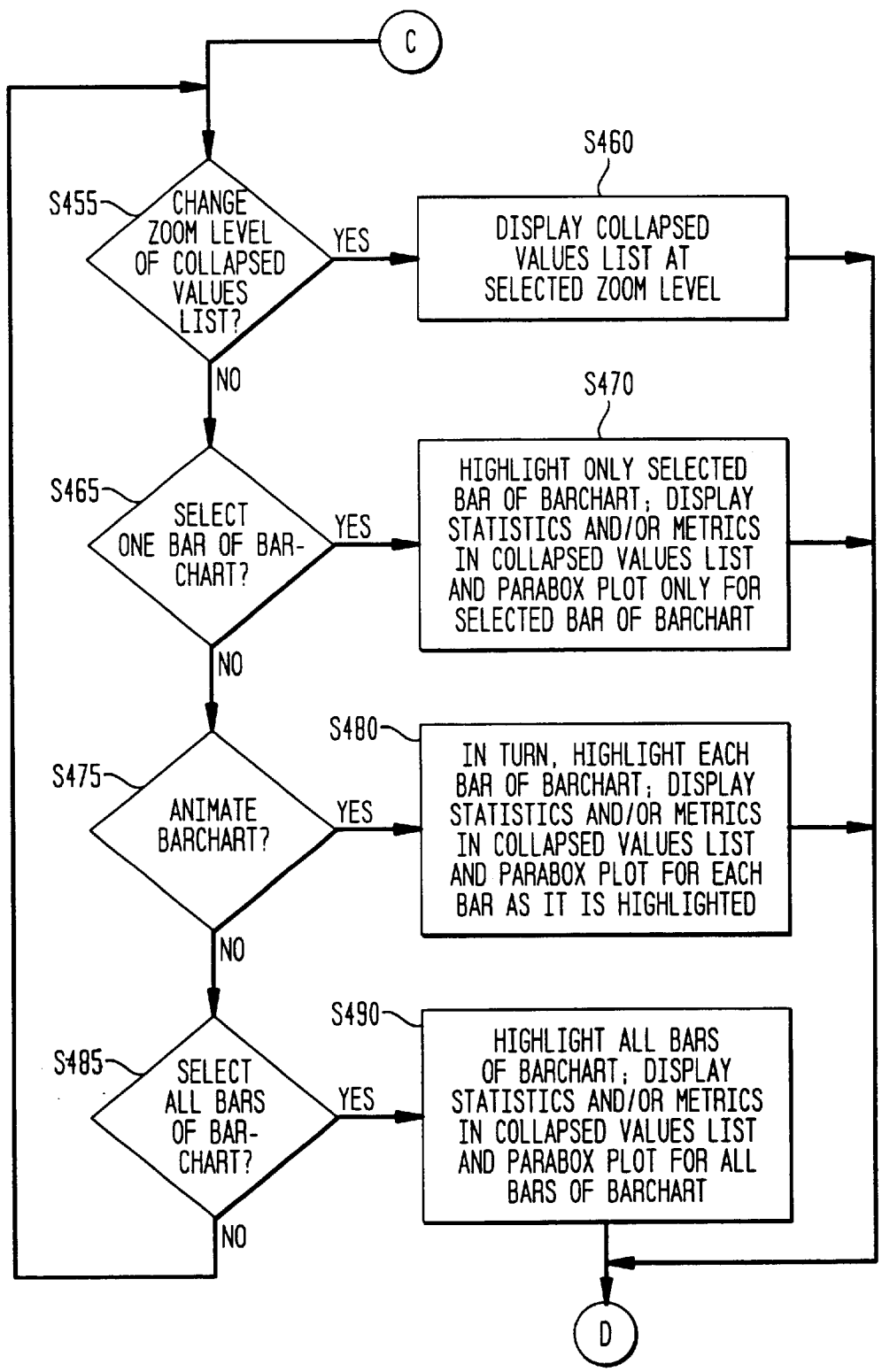

FIGS. 21A and 21B outline in greater detail the desired detail level selections/reselection process of steps S160 or S190. In particular, the detail level selection/reselection process allows the analyst to change the detail level for those views permitting such details to be set. For example, as outlined below, the detail level of the structure-wide views 100 and 200 shown in FIGS. 1 and 2 can be changed to focus in on a particular system of the application or a number of such systems.

Accordingly, the control routine for the detail level selection/reselection process, after starting in step S400, continues to step S405, where the control routine determines whether the analyst wishes to open a browser window. If so, control continues to step S410. Otherwise, control jumps to step S415. In step S410, the control routine opens a browser window to display a pixel view, a line view and a full text view of the program selected by the analyst for display in the browser window. Control then jumps to step S495.

In step S415, the control routine determines whether the analyst has set the pixel view. If so, control jumps to step S425. Otherwise, control continues to step S420. In step S420, the control routine determines whether the analyst has set the graph view. If so, control continues to step S425. Otherwise, control jumps to step S430. In step S425, the control routine allows the analyst to select the desired subsystem or small system to be displayed using either the pixel view or the graph view. Control then jumps to step S495.

In step S430, the control routine determines whether the analyst has set the line view. If so, control continues to step S435. Otherwise, control jumps to step S440. In step S435, the control routine allows the analyst to select the desired program to be displayed using the line view. Control then jumps to step S495.

In step S440, the control routine determines whether the analyst has set the structure-wide view. If so, control continues to step S445. Otherwise, control continues to step S450. In step S445, the control routine changes the zoom level to zoom in or out as a function of the zoom level set by the analyst. Control then jumps to step S495.

In step S450, the control routine determines whether the analyst has set the linked interactive graphic view. If so, control continues to step S455. Otherwise, control jumps to step S495. In step S455, the control routine determines whether the analyst wishes to change the zoom level of the collapsed values list of the linked interactive graphics view. If so, control continues to step S460. Otherwise, control jumps to step S465. In step S460, the control routine sets the zoom level of the collapsed values list to the zoom level selected by the analyst. Control then jumps to step S495.

In step S465, the control routine determines whether the analyst has selected one bar of the bar chart of the linked interactive graphics view. If so, control continues to step S470. Otherwise, control jumps to step S475. In step S470, the control routine sets the display to highlight only the selected bar of the bar chart. In addition, the collapsed value list and the parabox plot are modified so that they display only the values for the selected statistics and/or metrics that correspond to the elements of the selected bar of the bar chart. Control then jumps to step S495.

In step S475, the control routine determines whether the analyst wishes to animate the bar chart of the linked interactive graphics view. If so, control continues to step S480. Otherwise, control jumps to step S485. In step S480, the control routine sets the parameters for rendering the display to highlight, in turn, each bar of the bar chart. Additionally, these parameters ensure that, as each bar of the bar chart is highlighted during rendering, the control routine controls the display of the collapsed values list and the parabox plot so that only the values for the currently highlighted bar chart are highlighted using the color assigned to those values. Control then jumps to step S495.

In step S480, the elements determines whether the user has selected all bars of the bar chart of the linked interactive graphic view. If so, control continues to step S490. Otherwise, control jumps to step S455. In step S490, all of the bars of the bar chart of the linked interactive graphics view are highlighted. At the same time, all of the values corresponding to all of the elements of the bars of the bar chart are displayed in the collapsed value list and the parabox plot. Control then continues to step S495.

In step S495, the control routine returns control to step S170 to rerender the display as a function of the selected detail level.

Figure 22:
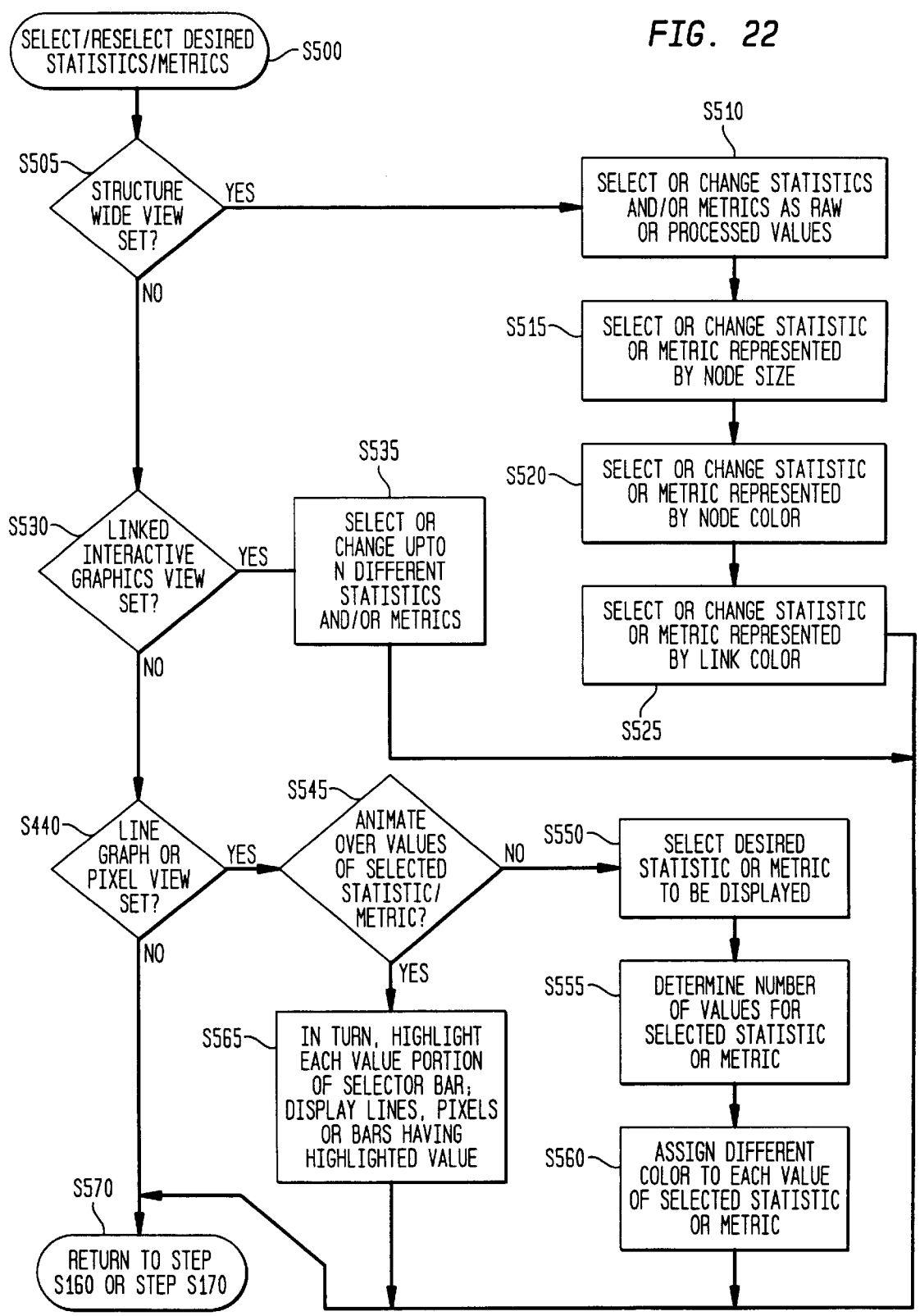
FIG. 22 is a flowchart outlining one embodiment of the steps of selecting and reselecting the desired statistic and/or metrics of FIGS. 19A and 19B according to this invention.

FIG. 22 shows the desired statistics/metrics selection/reselection process of steps S150 and S210 in greater detail. In particular, the desired statistics/metrics selection/reselection process begins in step S500, and continues to step S505. In step S505, the control routine determines whether the analyst has set the structure-wide view. If so, control continues to step S510. Otherwise, control jumps to step S530.

In step S510, the control routine allows the user to select or change whether one or more of these statistics to be displayed will be displayed using raw or processed values. That is, as described in greater detail below, the statistics can be displayed using their raw or unprocessed values. However, because of the large range of values to be displayed, large raw values tend to dominate the display. Thus, the analyst can choose to display processed values for these statistics, where the values are processed to reduce the range of values.

Then, in step S515, the control routine allows the analyst to select or change the particular statistic or metric to be represented by the node size in the structure-wide view. Next, in step S520, the control routine allows the analyst to select or change the statistic or metric that will be represented by the node color in the structure-wide view. Finally, in step S525, the control routine allows the user to select or change the statistic or metric that will be represented by the link color of the links shown in the structure-wide view. Control then jumps to step S570.

In step S530, the control routine determines whether the analyst has set the linked interactive graphics view. If so, control continues to step S535. Otherwise, control jumps to step S540. In step S535, the control routine allows the analyst to select or change up to N different statistics and/or metrics, where N is the number of different statistics that can be displayed using the collapsed values list and the parabox plot. Control then jumps to step S570.

In step S540, the control routine determines whether the line view, the graphic view, or the pixel view has been set by the analyst. If so, control continues to step S545. Otherwise, control jumps to step S570. In step S545, the control routine determines whether the user wishes to animate the line, graph or pixel view over the values of a selected statistic or metric used in rendering the line, graph, or pixel view. If the user does not wish to animate the selected view, control continues to step S550. However, if the analyst wishes to animate over the selected statistic or metric, control jumps to step S565.

In step S550, the control routine allows the analyst to select the desired statistic or metric to be displayed in the set line, graph or pixel. Then, in step S555, the control routine determines the number of different values for the selected statistic or metric. Next, in step S560, the control routine assigns a different color to each value of the selected statistic or metric. The control routine also sets the color bar of the line, graph, or pixel view to contain a number of different portions corresponding to the number of different values of the selected statistic. Control then jumps to step S570.

In step S565, the control routine sets the parameters for rendering the line, graph or pixel view so that, each value portion of the selected bar is in turn highlighted. Additionally, these parameters ensure that, as each value portion of the selected bar is highlighted during rendering, only the lines, pixels or bars of the line, pixel or graphics view, respectively, having the highlighted values are highlighted during rendered, using the assigned color for that value.

Control then continues to S570, which returns control to either step S160 or step S170, depending on whether S500 was entered from step S150 or step S210.

It should be appreciated that FIGS. 19A–22 only outline one embodiment of the software visualization process according to this invention. In particular, a number of additional software visualization processes according to this invention will become apparent from the following detailed description of the various views outlined above with respect to FIGS. 19A–22. Accordingly, the above description of the process according to this invention is illustrative rather than limiting.

Accordingly, from the visual analysis shown in FIGS. 1–17 performed according to the methods according to the principles of this invention shown in FIGS. 19A–22, and in particular the visual analysis of the GENERALLEDGER system 130, six significant facts have been discovered about the GENERALLEDGER system 130 by using the various aspects of this invention described above:

1. This system is complex. According to McCabe's cyclomatic complexity measure, shown in FIG. 2, and other complexity measures (not shown), the source code in the GENERALLEDGER system 130 is among the most complex in this legacy software application;
2. This system is strongly date-dependent. Many of the programs of the GENERALLEDGER system 130 involve large amounts of date manipulation, as shown in FIG. 1. This understanding is validated using the linked graphical views shown in FIGS. 6–8;
3. This system involves few date-dependent declarations (DC). By investigating some of the critical programs, such as the one shown in FIG. 14, a determination can be made that only a small percentage (15%) of the date-dependent lines involve declarations (DC);
4. This system includes large numbers of related files. As shown in FIG. 13, there are large number of sets of closely related files that are near duplicates of each other;
5. There are a low number of affected copybook lines. Thus, because there are also a relatively small number of copybooks, repairing the copybooks will have little impact on the completion of the overall conversion of this system; and
6. This system contains large programs, as indicated by the sizes of the nodes shown in FIG. 3, as well as the sizes of the rectangular file representations shown in FIG. 13.

Advantageously, in accordance with this invention, a number of conclusions and recommendations can thus be developed from these facts. The small number of declarations suggest that data expansion, as opposed to windowing logic, may be a good strategy as it involves changing fewer lines of code than code correction. However, since there are many sets of related files, care must be taken to properly propagate the repairs between such related files. Furthermore, the high complexity in this system, the large number of related files, and the strong date-dependence suggest that this system may be a candidate for a replacement. As indicated above, one strong factor in favor of replacement is the large number of related files that indicate maintenance problems.

Thus, by applying the software visualization tools of this invention, an analyst can quickly develop, for the exemplary legacy software application, a repair strategy for the single-most critical system of this application. In particular, the application-wide and system-level views allow an analyst to immediately obtain a broad perspective on a multi-million line code inventory, by using color coding to show the repair/modification-dependence of the systems, subsystems, and programs of the application. This representation is scaleable, efficient, and easily understood by software engineers. In particular, as shown in FIG. 4, comparing two nodal statistics by mapping one statistic or metric to node color and the other statistic or metric to link color allows these statistics and metrics to be easily compared. Previously, in an attempt to show two or more different statistics and/or metrics at the same time, innovative node glyphs and the like were used. However, because such innovative node glyphs have no widely-understood meaning, it was difficult for users to readily understand the significance of the displayed information using such innovative node glyphs. Rather, the user had to rely on a key to discern the significance of the displayed information. In contrast to such previous attempts to show multiple node statistics simultaneously using innovative node glyphs and the like, the views generated according to this invention allows the analyst to readily grasp the significance of the displayed information.

By using the linked graphical view 600–800 shown in FIGS. 6–8, strongly impacted and overly complex subsystems can be easily and efficiently identified. Furthermore, by allowing easy navigation between the various views shown in FIGS. 1–17, and by keeping all levels in view essentially simultaneously, the user context is preserved within the four-level hierarchy. By using task-specific views, it is possible to gain an intuitive understanding of the impact of a application-wide conversion or repair on the application at several levels simultaneously.

Further, as shown in FIGS. 14 and 16, browser windows, such as the browser window 1210, show the actual source code. The various symbolic representations of the programs forming a subsystem shown in FIGS. 13–17 can be viewed simultaneously, allowing comparisons between such programs and better analysis within and between such programs. Thus, closely related files and duplicated code regions can easily be identified and their impact measured, allowing the code conversion requirements to be realistically estimated.

Thus, applying the software visualization tools described above to the exemplary legacy software application, stage 1 of the conversion process, the assessment and strategic planning stage, was reduced from an estimated three weeks for an analysis using conventional tools to three days when using software visualization tools in accordance with the principles of the invention.

The software visualization tools of this invention were built on a general-purpose interactive environment developed for visual analysis specifically adapted for application-wide repair and conversion problems. The visualization tools of this invention are preferably built on a common platform, such as, for example, the "vz" software library, developed by Bell Laboratories, a division of Lucent Technologies Inc. "vz" is an object-oriented cross-platform C++ library, which encapsulates interaction, graphics, and view linking. "vz" provides the core objects and data structures for the visualization tools of this invention. "vz" currently runs under the UNIX system, MS Windows and supports the X11 and the Microsoft graphics APIs.

The application-wide and system-wide views of the visualization tools of this invention use a hierarchical graph structure, with nodes positioned radially as an organizing metaphor to show the three hierarchical levels of application systems. Acyclic graphs are natural representation for many software artifacts, particularly those involving abstraction. These graphs usually include node and link diagrams carefully arranged by sophisticated layout algorithms to show the underlying structures of complicated systems. The graphs may describe relationships such as procedure or function calls, or class inheritance. The function call graphs may be animated for a visual representation of how a program executes a color-coded "hot spots." Hot spots are parts of the system using excessive amounts of processing time that may be candidates for optimization.

The linked statistical views 600–800 shown in FIGS. 6–8 are an example of a general class of visual data analyst systems focusing on multi-dimensional data. The essence of these views is that an analyst may open several related views showing information from different perspectives. Each view functions as its own data analysis environment, working both as a visual display and as an input screen. As the analyst manipulates the displayed views, operations such as filtering and thresholding dynamically propagate among the views, thereby showing related information.

The software visualization tools generating the above-outlined views 100–1300 of this invention are preferably implemented on the programmed general purpose computer 1400 described above. However, the software visualization tools of this invention can be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device that supports a finite state machines is capable of implementing the software visualization tools of this invention.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for analyzing a change to a software structure, comprising:

identifying a plurality of elements of the software structure;

identifying at least one programming consequence as a function of the change to the software structure;

analyzing particular ones of the plurality of elements to obtain values corresponding to each particular one of the plurality of elements for at least one statistic about the plurality of elements;

rendering a view, including at least one symbolic representation of at least one element of the plurality of elements as a function of at least one of the at least one programming consequence and the at least one statistic; and displaying the rendered view, wherein the change to the software structure is analyzed in view of an application-wide analysis that is monitored by a controller.

2. The method of claim 1, wherein the rendering the view step comprises:

receiving at least one input identifying:
      one of a plurality of views to be rendered,
      a detail level of the identified view, and
      at least one programming consequence or statistic; and rendering symbolic representations of a subset of the identified elements corresponding to the identified view and the identified detail level as a function of values of the at least one identified programming consequence or statistic.

3. The method of claim 2, wherein the rendering the view step further comprises:

receiving a further input identifying a different one of the plurality of views to be rendered; and rendering symbolic representations of a subset of the identified elements corresponding to the different identified view and the identified detail level as a function of the values of the at least one identified programming consequence or statistic.

4. The method of claim 2, wherein the rendering the view step further comprises:

receiving a further input from the user identifying a different detail level of the identified view; and rendering symbolic representations of a subset of the identified elements corresponding to the identified view and the different identified detail level as a function of the values of the at least one identified programming consequence or statistic.

5. The method of claim 2, wherein the rendering the view step further comprises:

receiving a further input from the user identifying at least one different programming consequence or statistic; and rendering symbolic representations of a subset of the identified elements corresponding to the identified view and the identified detail level as a function of the values of the at least one different identified programming consequence or statistic.

6. The method of claim 2, wherein the plurality of views comprise at least two of:
   a structure-wide view;
   a linked interactive graphic view;
   a pixel view;
   a graph view;
   a line view; and
   a values list view.

7. The method of claim 6, wherein, when the identified view is a structure-wide view, the receiving at least one input step comprises receiving an indication of a zoom level.

8. The method of claim 6, wherein, when the identified view is the pixel view or the graph view, the receiving at least one input step comprises receiving an identification of a subsystem or small system of the software structure.

9. The method of claim 6, wherein, when the identified view is the line view, the receiving at least one input step comprises receiving an identification of a program of the software structure.

10. The method of claim 6, wherein, when the identified view is the linked interactive graphic view, the receiving at least one input step comprises at least one of:
    receiving an indication of a zoom level of a collapsed values list of the link inactive graphics view;
    receiving a selection of a single bar of a bar chart of the linked interactive graphics view to be rendered in a selected state;
    receiving an indication that all bars of the bar chart are to be rendered in the selected state; and
    receiving an indication that each of the bars of the bar chart is to be rendered in turn in the selected state.

11. The method of claim 10, further comprising, when the received indication indicates at least one bar of the bar chart is to be rendered in the selected state, setting the elements corresponding to the selected bar to the selected state for graphics linked to the bar chart in the linked interactive graphics view.

12. The method of claim 11, wherein the graphics of the linked interactive graphics view linked to the bar chart comprise a collapsed values list and a parabox plot.

13. The method of claim 6, wherein, the linked interactive graphics view comprises a bar chart, a collapsed values list and a parabox plot.

14. The method of claim 6, wherein, when the identified view is the structured-wide view, the receiving at least one input step comprises:
    receiving an indication of a selected programming consequence or statistic to be represented by node size of nodes of the structure-wide view;
    receiving an indication of a programming consequence or statistic to be represented by node color of the nodes of the structure-wide view; and
    receiving an indication of the programming consequence or statistic to be represented by links between the nodes of the structure-wide view.

15. The method of claim 6, wherein, when the identified view is the structured-wide view, the receiving at least one input step comprises receiving an indication of whether the symbolic representations of the subset of the identified elements corresponding to the identified view and the identified detail level are to be rendered as a function of unprocessed values or processed values of the at least one identified programming consequence or statistic.

16. The method of claim 6, wherein, when a linked interactive graphics view is identified, the receiving at least one input step comprises receiving an indication of between one and N different ones of the at least one identified programming consequence or statistic to be used in rendering graphs of the linked interactive graphics view.

17. The method of claim 6, wherein, when the line, graph, or pixel view is identified, the receiving at least one input step comprises:
    receiving an indication of a programming consequence or statistic to be rendered;
    determining a number of values for the identified programming consequence or statistic;
    assigning a different rendering value to each value of the programming consequence or statistic.

18. The method of claim 17, wherein the rendering the view step comprises rendering a selection bar, the selection bar having a number of selection portions corresponding to the determined number of values for the programming consequence or statistic, the selection portions of the selection bar rendered according to the corresponding assigned rendering values.

19. The method of claim 18, where the rendering values are different colors.

20. The method of claim 6, wherein, when the line, graph, or pixel view is identified, the receiving at least one input step comprises receiving a further input indicating the identified view is to be animated over the identified programming consequence or statistic.

21. The method of claim 20, wherein, when the further input indicates animation, the rendering the view step comprises:
    rendering, in turn, one of the selection portions of the selection bar in a selected state using the assigned rendering value; and
    rendering each symbolic representation of the identified view having a value for the identified programming consequence or statistic corresponding to the rendered one of the plurality of selection portions of the selection bar using the corresponding rendering value.

22. The method of claim 2, wherein the receiving at least one input step comprises receiving an input indicating a browser window of a selected element of the subset of identified elements displayed in the rendered view is to be rendered.

23. The method of claim 22, wherein, when the received input indicates a browser window is to be opened, the rendering the view step comprises rendering the browser window containing at least a full text view of the selected element.

24. The method of claim 23, wherein the browser window further includes containing a pixel view of the selected element and a line view of the selected element.

25. The method of claim 2, wherein the receiving at least one identifying input step comprises:
    receiving a first input identifying the one of the plurality of different views to be rendered;
    receiving a second input identifying the detail level; and
    receiving a third input identifying the at least one programming consequence or statistic.

26. A method for analyzing a structure of an application program, comprising:
  identifying at lea st one characteristic of the application program which requires a change to at least one instruction of the application program;
  determining values for at least one statistic as a function of the structure of the application program;
  analyzing the change to the at least one instruction to determine a plurality of consequences associated with the change to at least one instruction of the application program; and
  rendering a structural view of the application program as a function of at least one of:
    at least one consequence of the plurality of consequences, and
    values of at least one statistic of the at least one statistic,
  wherein the structure of the application program is analyzed in view of an application-wide analysis that is monitored by a controller.

27. The method of claim 26, wherein the plurality of statistics define a complexity level for the application program.

28. The method of claim 26, further comprising:
  identifying a plurality of modifications to the application program as a function of the rendered structural view.

29. The method of claim 26, wherein the structure of the application program comprises a plurality of program elements, the rendering the structural view step comprising:
  rendering at least one symbolic representation of at least one element of the plurality of elements as a function of the at least one of the at least one consequence and the values of the at least one statistic.

30. The method of claim 26, further comprising:
  rerendering the structural view of the application program as a function of at least one of:
    a different at least one consequence of the plurality of consequences, and
    values of a different at least one statistic of the at least one statistic.

31. The method of claim 26, further comprising:
  rendering a different structural view of the application program as a function of the at least one of the at least one consequence and values of the at least one statistic.

32. The method of claim 26, further comprising:
  receiving an input; and
  altering the structural view of the application program in response to the received input.

33. A method for analyzing a software structure for implementing a change to the software structure, comprising:
  identifying particular elements of the software structure associated with the change to the software structure;
  analyzing the particular elements to determine a plurality of programming consequences as a function of the change;
  rendering a view of the software structure as a function of particular ones of the plurality of consequences,
  wherein the software structure is analyzed in view of an application-wide analysis that is monitored by a controller.

34. The method of claim 33, wherein the software structure comprises a plurality of elements, the rendering the view step comprising:
  rendering at least one symbolic representation of at least one element of the plurality of elements as a function of the particular ones of the plurality of consequences.

35. The method of claim 33, further comprising:
  identifying a plurality of modifications to the software structure as a function of the rendered view.

36. The method of claim 33, wherein the plurality of consequences includes:
  a plurality of lines of the software structure that are not affected by the change; and
  a plurality of lines of the software structure that are affected by the change.

37. The method of claim 36, wherein the plurality of consequences further includes, for each affected line, a type of instruction of that line.

38. The method of claim 33, further comprising:
  analyzing the software structure to determine a plurality of statistics about the software structure; and
  rendering the view of the software structure as a function of both the particular ones of the plurality of consequences and particular ones of the plurality of statistics.

39. An apparatus for analyzing a software structure as a function of a change to the software structure, comprising:
  a memory that stores data according to at least one statistic determined as a function of the software structure and to at least one programming consequence to the software structure arising from the change;
  a rendering device capable of rendering at least one view of the software structure as a function of at least one of the at least one programming consequence and the at least one statistic, each view including a plurality of symbolic representations, each symbolic representation representing information about at least one of a plurality of elements of the software structure; and
  a display device capable of displaying the at least one view of the software structure,
  wherein the software structure is analyzed in view of an application-wide analysis that is monitored by a controller.

40. The software analysis apparatus of claim 39, wherein a first one of the at least one view of the software structure is a structural view of the software structure, the structural view indicating an organization of the software structure.

41. The software analysis apparatus of claim 40, wherein, in the first view of the software structure, the symbolic representations include a plurality of nodes and a plurality of links between the nodes, where each node represents one of the elements of the software structure and each link indicates a relationship between the nodes connected by that link.

42. The software analysis apparatus of claim 40, wherein, in the first view of the software structure, the symbolic representations include a plurality of nodes and a plurality of links between the nodes, where each node represents one of a system of the software structure, a subsystem of the software structure or a program of the software structure, and each link indicates a relationship between the nodes connected by that link.

43. The software analysis apparatus of claim 42, wherein the software structure comprises at least one system, each system having a plurality of subsystems and each subsystem having a plurality of programs, the nodes representing the subsystems and programs of each system arranged in concentric circles around the node representing that system.

44. The software analysis apparatus of claim 42, wherein the software structure comprises at least one system, each system having a plurality of programs, the nodes representing the programs of each system arranged in a concentric circle around the node representing that system.

45. The software analysis apparatus of claim 42, wherein:

the software structure comprises at least one first system and at least one second system;

each first system has a plurality of subsystems, each subsystem having a plurality of programs, the nodes representing the subsystems and programs of each first system arranged in concentric circles around the node representing that first system; and each second system has a plurality of programs, the nodes representing the programs of each second system arranged in a concentric circle around the node representing that second system.

46. The software analysis apparatus of claim 42, wherein for each node, a size of that node corresponds to the corresponding value of a first one of the at least one statistic and a color of that node corresponds to the corresponding value of a second one of the at least one statistic.

47. The software analysis apparatus of claim 46, wherein, for each link, a color of the links corresponds to the corresponding value of one of the first or second one of the at least one statistic.

48. The software analysis apparatus of claim 46, wherein a color of the links corresponds to the corresponding values of a third one of the at least one statistic.

49. The software analysis apparatus of claim 39, wherein:

the software structure is organized into a plurality of hierarchical levels, each level including at least one element; and the symbolic representations include a plurality of nodes and a plurality of links between the nodes, each node representing one element of the software structure and each link indicating a hierarchical relationship between the nodes connected by that link.

50. The software analysis apparatus of claim 49, wherein:

a first hierarchical level of the software structure is represented as at least one central node; and the nodes representing each subsequent hierarchical level of the first hierarchical level are arranged in concentric circles around each of the at least one central node representing the first hierarchical level.

51. The software analysis apparatus of claim 39, wherein the at least one statistic includes at least one of software structure statistics and software metrics.

52. The software analysis apparatus of claim 51, wherein the software structure statistics includes at least one of:

at least one size metric;

at least one characteristic-related statistic; and a hierarchy.

53. The software analysis apparatus of claim 52, wherein the at least one size metric includes at least one of:

number of applications;

number of systems;

number of subsystems number of programs number of lines;

number of paragraphs;

number of copybooks; and number of modifications.

54. The software analysis apparatus of claim 52, wherein the at least one characteristic-related statistic is determined as a function of at least one characteristic of the software structure, the at least one characteristic comprising at least one of:

date-dependence;

currency-dependence;

postal code-dependence;

modification history;

maker of modification; and date of modification.

55. The software analysis apparatus of claim 54, wherein, when the at least one statistic is a function of one of date-dependence, currency-dependence or postal-code dependence, the at least one characteristic-related statistic further includes type of instruction.

56. The software analysis apparatus of claim 51, wherein the software metrics includes at least one of:

a complexity metric;

a size metric; and a economic metric.

57. The software analysis apparatus of claim 56, wherein the at least one complexity metric includes at least one of:

McCabe's cyclomatic complexity metric;

McCabe's essential complexity metric; and

McClure's control variable complexity metric.

58. The software analysis apparatus of claim 56, wherein the at least one size metric includes at least Halstead's volume measure of program length.

59. The software analysis apparatus of claim 56, wherein the at least one economic metric includes at least modification cost.

60. The software analysis apparatus of claim 39, wherein, in a first one of the at least one view, the plurality of symbolic representations comprise a set of first symbolic representations and a set of second symbolic representations, each one of the set of first symbolic representations representing a subsystem or small system of the software structure and each one of the set of second symbolic representations representing a program of the software structure.

61. The software analysis apparatus of claim 60, wherein:

a size of each one of the set of first symbolic representations corresponds to a first one of the at least one statistic;

a size of each one of the set of second symbolic representations corresponds to a selected detail level;

the set of second symbolic representations is divided into at least one subset of second symbolic representations; and a color of the second symbolic representations of each subset corresponds to a value of a different one of the at least one statistic, which is also different than the first statistic.

62. The software analysis apparatus of claim 61, wherein the first view further comprises a parabox plot, the parabox plot plotting the values for each of the different ones of the at least one statistic of the at least one subset.

63. The software analysis apparatus of claim 62, wherein, when one of the set of first symbolic representations is selected, the corresponding ones of the set of second symbolic representations and the corresponding values plotted in the parabox plot are rendered according to the values of the different ones of the at least one statistic.

64. The software analysis apparatus of claim 61, wherein, when one of the set of first symbolic representations is selected, the corresponding ones of the set of second symbolic representations are rendered according to values of the different ones of the at least one statistic, and when one of the first symbolic representations is unselected, the corresponding ones of the set of second symbolic representations is rendered in a neutral state.

65. The software analysis apparatus of claim 39, wherein a first view of the least one view further comprises a selector bar, the selector bar divided into a number of portions, each portion corresponding to a different value of a selected programming consequence or statistic and having a different appearance, an appearance of each symbolic representation having one of the different values of the selected statistic set to the appearance of the portion corresponding to that value.

66. The software analysis apparatus of claim 65, wherein each symbolic representation is a block view of a program of a selected subsystem of the software structure.

67. The software analysis apparatus of claim 65, wherein each symbolic representation is a pixel view of at least one program of a selected subsystem of the software structure.

68. The software analysis apparatus of claim 67, wherein the selected statistic is type of instruction, and each symbolic representation is a pixel view of lines of the programs of a selected subsystem of the software structure, where appearances of the lines of the programs are displayed according to their instruction type.

69. The software analysis apparatus of claim 67, wherein the values for the type of instruction statistic include:
   whether the line is affected by a selected dependence characteristic,
   affected declarations,
   affected data operations, and
   affected data transfers.

70. The software analysis apparatus of claim 67, wherein the selected statistic is number of copybooks, each value is the identifier of one of the copybooks, and each symbolic representation is a pixel view of the programs of a selected subsystem of the software structure, where appearances of segments of the programs are displayed according to their inclusion in a copybook.

71. The software analysis apparatus of claim 65, wherein each symbolic representation is a line view of lines of at least one program of a selected subsystem of the software structure.

72. The software analysis apparatus of claim 71, wherein the selected statistic is type of instruction and appearances of the lines of the program are displayed according to their instruction type.

73. The software analysis apparatus of claim 71, wherein the values for the type of instruction statistic include:
   whether the line is affected by a selected characteristic,
   affected declarations,
   affected data operations, and
   affected data transfers.

74. The software analysis apparatus of claim 65, wherein the different appearances of the portions of the colorbar are different colors.

75. The software analysis apparatus of claim 65, further comprising a browser window displaying a selected program of the software structure, the browser window containing a full-text view of a first portion of the selected program.

76. The software analysis apparatus of claim 75, wherein the browser window further containing at least one of:
   a line view symbolic representation of a second portion of the selected program, the second portion including the first portion; and
   a pixel view symbolic representation of the entire selected program.

77. The software analysis apparatus of claim 39, wherein the software structure is one of a software portfolio or a software application.

* * * * *